(12) United States Patent
Schlie et al.

(10) Patent No.: US 8,213,471 B2
(45) Date of Patent: Jul. 3, 2012

(54) THIN DISK LASER OPERATIONS WITH UNIQUE THERMAL MANAGEMENT

(75) Inventors: LaVerne Arthur Schlie, Albuquerque, NM (US); Hongbin Ma, Columbia, MO (US); Douglas E. Smith, Columbia, MO (US); Vitaly Gruzdev, Columbia, MO (US)

(73) Assignees: Integral Laser Solutions, LLC, Albuquerque, NM (US); The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 13/012,697

(22) Filed: Jan. 24, 2011

(65) Prior Publication Data
US 2011/0206077 A1    Aug. 25, 2011

Related U.S. Application Data

(60) Provisional application No. 61/297,546, filed on Jan. 22, 2010.

(51) Int. Cl.
*H01S 3/04* (2006.01)
*H01S 3/07* (2006.01)

(52) U.S. Cl. .......................... 372/35; 372/67

(58) Field of Classification Search ............ 372/35, 372/67
See application file for complete search history.

(56) References Cited

U.S. PATENT DOCUMENTS

| | | | |
|---|---|---|---|
| 4,921,041 A | 5/1990 | Akachi | |
| 5,335,237 A | 8/1994 | Zapata | |
| 5,553,088 A | 9/1996 | Brauch et al. | |
| 6,158,502 A | 12/2000 | Thomas | |
| 6,167,948 B1 | 1/2001 | Thomas | |
| 6,347,109 B1 | 2/2002 | Beach et al. | |
| 6,438,152 B2 | 8/2002 | Contag et al. | |
| 6,577,666 B2 | 6/2003 | Erhard et al. | |
| 6,600,763 B2 | 7/2003 | Ludewigt | |
| 6,804,274 B2 | 10/2004 | Huonker et al. | |
| 6,891,874 B2 | 5/2005 | Erhard et al. | |
| 6,963,592 B2 | 11/2005 | Huonker et al. | |
| 7,003,011 B2 | 2/2006 | Kafka et al. | |
| 7,200,160 B2 | 4/2007 | Ludewigt | |
| 7,200,161 B2 | 4/2007 | Vetrovec | |
| 2007/0238219 A1 | 10/2007 | Bennett et al. | |
| 2009/0126922 A1 | 5/2009 | Vetrovec | |

(Continued)

FOREIGN PATENT DOCUMENTS
DE    100 38 006 A1    2/2002

OTHER PUBLICATIONS

Backhaus, S. et al., "A thermoacousitc Stirling heat engine", Nature, vol. 399, Macmillan Magazines Ltd., May 27, 1999, 335-338.

(Continued)

*Primary Examiner* — Armando Rodriguez
(74) *Attorney, Agent, or Firm* — Jeffrey D. Myers; Peacock Myers, P.C.

(57) ABSTRACT

A thermal management apparatus and method for a thin disk laser system enabling the laser system to have near isothermal temperatures across and throughout a thin disk comprising a mechanically controlled oscillating heat pipe having effective thermal conductivity of 10-20,000 W/m*K that promotes near isothermal conditions in lasing of the thin disk, a thin disk lasing crystal or ceramic bonded to the mechanically controlled oscillating heat pipe, and a supporting structure including a surface bonded to the thin disk that matches the CTE (coefficient of thermal expansion) of both materials.

16 Claims, 29 Drawing Sheets

SCHEMATIC of HIGH POWER THIN DISK LASER

U.S. PATENT DOCUMENTS

Figure 1:
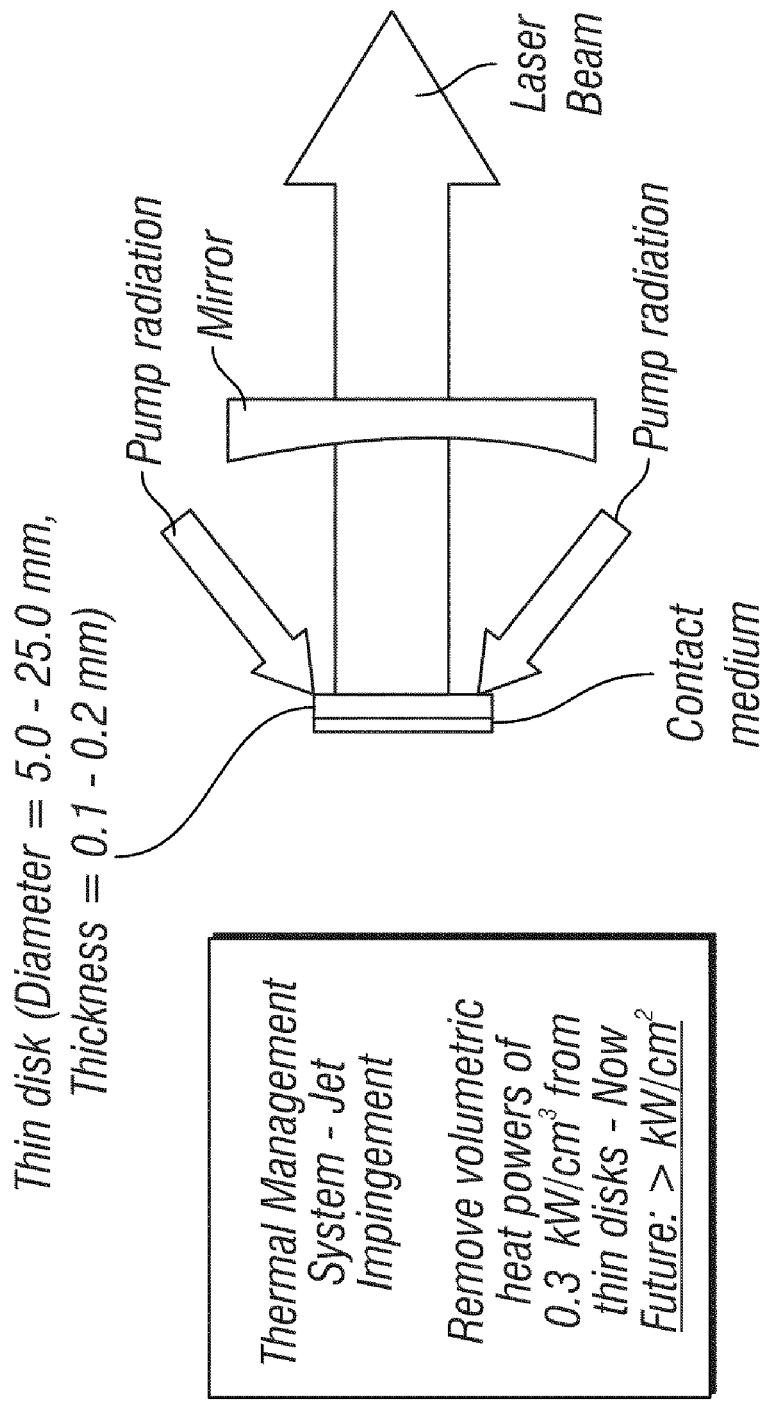

2009/0161702 A1  6/2009  Takeshita et al.

OTHER PUBLICATIONS

Bang, In C. et al., "Boiling heat transfer performance and phenomena of Al2O3-water nano-fluids from a plain surface in a pool", International Journal of Heat and Mass Transfer, vol. 48, Elsevier Ltd., 2005, 2407-2419.

Borgmeyer, B. et al., "Experimental Investigation of Oscillating Motions in a Flat Plate Pulsating Heat Pipe", Journal of Thermophysics and Heat Transfer, vol. 21, No. 2, Apr.-Jun. 2007, 405-409.

Brown, David C., "Nonlinear Thermal Distortion in YAG Rod Amplifiers", IEEE Journal of Quantum Electronics, vol. 34, No. 12, IEEE, Dec. 1998, 2283-2392.

Cai, Qingjun et al., "An Infestigation of Temperature Characteristics of Pulsating Heat Pipe", Proceedings of IMECE2005, 2005 ASME International Mechanical Enginerring Congress and Exposition, Orlando, FL., May 5-11, 2005, 1-6.

Choi, S. U. et al., "Anomalous thermal conductivity enhancement in nanotube suspensions", Applied Physics Letters, vol. 79, No. 14, American Institute of Physics, Oct. 1, 2001, 2252-2254.

Choi, Stephen U. et al., "Enhancing Thermal Conductivity of Fluids with Nanoparticles", Developments and Applications of Non-Newtonian Flows, ed. D.A. Siginer and H.P. Wang, The American Society of Mechanical Engineers, New York, FED-vol. 231/MD-vol. 66, 1995, 99-105.

Contag, K. et al., "Theoretical modelling and experimental investigations of the diode-pumped thin-disk Yb: YAG laser", Quantum Electroni, vol. 29, 1999, 697-703.

Das, S. P. et al., "Thermally induced two-phase oscillating flow inside a capillary tube", International Journal of Heat and Mass Transfer, vol. 53, 2010, 3905-3913.

Das, Sarit K. et al., "Heat Transfer in Nanofluids—A Review", Heat Transfer Engineering, vol. 27, No. 10, 2006, 3-19.

Demsky, S. M. et al., "Thin Film Evaporation on a Curved Surface", Microscale Thermophysical Engineering, vol. 8, Taylor & Francis Inc., 2004, 285-299.

Eastman, J. A. et al., "Anomalously increased effective thermal conductivities of ethylene glycol-based nanofluds containing copper nanoparticles", Applied Physics Letters, vol. 78, No. 4, Feb. 5, 2001, 710-720.

Giesen, A. et al., "Scalable Concept for Diode-Pumped High-Power Solid-State Lasers", Appl. Phys. B, vol. 58, Springer-Verlag, 1994, 365-372.

Giesen, Adolf et al., "Fifteen Years of Work on Thin-Disk Lasers: Results and Scaling Laws", IEEE Journal of Selected Topics in Quantum Electronics, vol. 13, No. 3, May/Jun. 2007, 598-609.

Han, Xu et al., "Investigations on the heat transport capability of a cryogenic oscillating heat pipe and its application in achieving ultrafast cooling rates for cell vitrification cryopreservation", Cryobiology, vol. 56, Elsevier Inc., 2008, 195-203.

Hanlon, M. A. et al., "Evaporation Heat Transfer in Sintered Porous Media", Transactions of the ASME, vol. 125, ASME, Aug. 2003, 644-652.

Hellstrom, J. E. et al., "Efficient Ybh:KGW lasers end-pumped by high-power diode bars", Appl. Phys. B, vol. 83, Jun. 27, 2006, 235-236.

Innocenzi, M. E. et al., "Thermal modeling of continuous-wave end-pumped solid-state lasers", Appl. Phys. Lett., vol. 56, No. 19, American Institute of Physics, May 7, 1990, 1831-1833.

Karunanithi, R. et al., "Development of Cryogenic Loop Heat Pipe", Transactions of the Cryogenic Engineering Conference, vol. 53, American Institute of Physics, 2008, 393-400.

Kaviany, M., "Chapter 12, Phase Change", Principles of Heat Transfer in Porous Media, Springer, N.Y., 1995.

Kaviany, M., "Performance of a Heat Exchanger Based on Enhanced Heat Diffusion in Fluids by Oscillation: Analysis", Journal of Heat Transfer, vol. 112, ASME, Feb. 1990, 49-55.

Kaviany, M. et al., "Performance of a Heat Exchanger Based on Enhanced Heat Diffusion in Fluids by Oscillation: Experiment", Transactions of the ASME, vol. 112, ASME, Feb. 1990, 56-63.

Khandekar, Sameer et al., "An insight into thermo-hydrodynamic coupling in closed loop pulsating heat pipes", International Journal of Thermal Sciences, vol. 43, 2004, 13-20.

Khandekar, Sameer et al., "Thermal Performance Modeling of pulsating Heat Pipes by Artificial Neural Network", Proceedings of 12th International Heat Pipe Conference, Moscow, Russia, 2002, 215-219.

Koechner, W., Solid-State Laser Engineering, $6^{th}$ Revision, Springer Series in Optical Sciences, New York, NY, 2006, pp. 426-431; 437-439.

Kouznetsov, Dmitrii et al., "Surface loss limit of the power scaling of a thin-disk laser", J. Opt. Soc. Am. B, vol. 23, No. 6, Optical Society of America, Jun. 2006, 1074-1082.

Kurzweg, U. H., "Enhanced Heat Conduction in Fluids Subjected to Sinusoidal Oscillations", Journal of Heat Transfer, vol. 107, ASME, May 1985, 459-462.

Kurzweg, U. H. et al., "Heat transfer by high-frequency oscillations: A new hydrodynamic technique for achieving large effective thermal conductivities", Phys. Fluids, vol. 27, No. 11, Nov. 1984, 2624-2627.

Liang, S. B. et al., "Thermoacoustic power effect on the refrigeration performance of thermal seperators", Cryogenics, vol. 43, Elsevier Ltd., 2003, 493-500.

Liao, Yan et al., "Pressure tuning of thermal lensing for high-power scaling", Optics Letters, vol. 24, No. 19, Oct. 1, 1999, 1343-1345.

Liter, Scott G. et al., "Pool-boiling CHF enhancement by modulated porous-layer coating: theory and experiment", International Journal of Heat and Mass Transfer, vol. 44, Elsevier Science Ltd., 2001, 4287-4311.

Lobad, Ahmed et al., "Characterization of a Multikilowatt Yb:YAG Ceramic Thin-Disk Laser", J. of Directed Energy, Mar. 2011, 1.

Ma, H. B. et al., "An Experimental Investigation of Heat Transport Capability in a Nanofluid Oscillating Heat Pipe", Journal of Heat Transfer, vol. 128, ASME, Nov. 2006, 1213-1216.

Ma, H. B. et al., "An investigation of oscillating motions in a miniature pulsating heat pipe", Microfluid Nanofluid, vol. 2, 2006, 171-179.

Ma, H. B. et al., "Heat Transport Capability in an Oscillating Heat Pipe", Journal of Heat Transfer, vol. 130, ASME, Aug. 2008, 081501-1-7.

Qu, W. et al., "Theoretical analysis of startup of a pulsating heat pipe", International Journal of Heat and Mass Transfer, vol. 50, Elsevier Ltd., 2007, 2309-2316.

Qu, Wei et al., "Experimental Investigation on Flow and Heat Transfer of a Pulsating Heat Pipe", Heat Pipe Science Technology Application, Proceedings of the 12th International Heat Pipe Conference, Moscow, Russia, May 19-24, 2002, 226-231.

Seger, Kai et al., "Tunable Yb:KYW laser using a transversely chirped volume Bragg grating", Optics Express, vol. 17, No. 4, Feb. 16, 2009, 2341-2347.

Stewen, Christian et al., "A 1-kW CW Thin Disc Layer", IEEE Journal of Selected Topics in Quantum Elecronics, vol. 6, No. 4, Jul./Aug. 2000, 650-657.

Swift, K. M. et al., "Dispersion of gases in atomic iodine lasers at 1.315 um", Applied Optics, vol. 27, No. 21, Nov. 1, 1988, 4377-4384.

Thome, J. R., "Chapter 6, Mechanisms of Enhanced Nucleate Pool Boiling", Enhanced Boiling Heat Transfer, Hemisphere Publishing Corporation, New York, 1990, 91-150.

Thompson, S. M. et al., "Effect of Localized Heating on Three-Dimensional Flat-Plate Oscillating Heat Pipe", Advances in Mechanical Engineering, vol. 2010, Hindawi Publishing Corporation, 2010, 1-10.

Thompson, S. M. et al., "Experimental Investigation of Miniature Three-Dimensional Flat-Plate Oscillating Heat Pipe", Journal of Heat Transfer, vol. 131, ASME, Apr. 2009, 043210-1-9.

Webb, R. L., Principles of Enhanced Heat Transfer, John Wiley & Sons, Inc., New York, 1994, 330-331.

Wilson, C. et al., "Visual Observation of Oscillating Heat Pipes Using Neutron Radiography", Journal of Thermophysics and Heat Transfer, vol. 22, No. 3, Jul.-Sep. 2008, 366-372.

Womac, D. J. et al., "Correlating Equations for Impingement Cooling of Small Heat Sources with Single Circular Liquid Jets", Transactions of the ASME, vol. 115, Feb. 1993, 106-115.

Wynne, Rosalind et al., "Thermal coefficients of the expansion and refractive index in YAG", Applied Optics, vol. 38, No. 15, May 20, 1999, 3282-3284.

Xuan, Yimin et al., "Investigation on Convective Heat Transfer and Flow Features of Nanofluids", Journal of Heat Transfer, vol. 125, ASME, Feb. 2003, 151-155.

Zhang, Yuwen et al., "Heat transfer in a pulsating heat pipe with open end", International Journal of Heat and Mass Transfer, vol. 45, 2002, 755-764.

Zhang, Yuwen et al., "Nonequilibrium heat conduction in a nanofluid layer with periodic heat flux", International Journal of Heat and Mass Transfer, vol. 51, Elsevier Ltd., 2008, 4862-4874.

Zhang, Yuwen et al., "Oscillatory Flow in Pulsating Heat Pipes with Arbitrary Numbers of Turns", Journal of Thermophysics and Heat Transfer, vol. 17, No. 3, Jul.-Sep. 2003, 340.

SCHEMATIC of HIGH POWER THIN DISK LASER

"Cold Finger"
Stress Results

*"Cold Finger"*
*Stress Results*

$\sigma_{mx} = 105.1\ MPa$ $\sigma_{mx} = 120.3\ MPa$ $t_B = 1\ mm$
$K = 10k\ W/mK$

Oscilating Heat Pipes

- Thermal Efficiency ↑
- Higher driving force
  - Thermally driven
  - Capillary force
- Higher heat transfer coefficient
  - Evaporation/Condensation
  - Forced convection
- Lower pressure drops
  - Vapor bubbles and liquid plugs
  - Parallel flow
  - No wick structures
- Low manufacturing cost

"Heat Spreader" for Yb:YAG Thin Disk

"Heat Spreader" Special Type of
Heat Pipe with $K_{therm} \cong 10\text{-}20,000$ W/m*K Laser Disk

*Case 1: <u>Square</u> or <u>Rectangular</u> "Cold" - Plate Serving as Advanced Heat Spreader*

Case 2: <u>Round</u> "Cold" - Plate Serving as Advanced Heat Spreader 1 cm diameter x 225 micron Yb:YAG thick thin disk

Multi-Beam Pumping with Parabolic Mirror

Folding Beam Path Pumped From Back

Multi-Beam Pumping with Parabolic Mirror

Multi-Beam Pumping with Parabolic Mirror

THIN DISK LASER OPERATIONS WITH UNIQUE THERMAL MANAGEMENT

CROSS-REFERENCE TO RELATED APPLICATIONS

This application claims priority to and the benefit of the filing of U.S. Provisional Patent Application Ser. No. 61/297,546, entitled "Enhanced Thin Disk Laser Performance with Near Isothermal Control", filed on Jan. 22, 2010, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to the thermal management aspect of a lasing thin disk which is nominally 200 microns ($10^{-6}$ meters), 1-2 cm in diameter and crystalline/ceramic material like Yb:YAG, tungstates, sesquioxides and others. The emphasis of this novel thermal management of the thin disk laser is an attempt to achieve much more uniform temperature profile across the lasing thin disk and efficient heat conduction for the lasing thin disk to greatly improve its beam quality (BQ) thus enabling much more widespread use.

2. Description of Related Art

Note that the following discussion may refer to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

High power solid-state lasers (SSL) have become the emphasis for industrial and commercial applications due to their efficiency, compactness and small supporting infrastructure relative to high power electrical or chemical gas laser system. Scaling SSL to high powers (>kW's and approaching 100 kW's) has required specific attention to thermal management. Over the last 15 years, thin disk laser has been developed and matured in Germany into reliable laser systems operating at kW's of average powers and used extensively for welding, cutting and material processing. In spite of this success, there are several issues needed to be improved to advance TDL technology to next level, including (1) thermal management; (2) power limitations by amplified spontaneous emission (ASE); (3) thin-disk gain material fabrication for reliable operation and (4) improved homogenization of the pumping laser diode radiation to acquire nearly perfect "flat-top" intensity profiles. This invention focuses on the thermal management aspect of the lasing thin disk.

The thin disk laser (TDL) pioneered by Giesen has demonstrated high powers (>4-5 kW) and "wall plug" efficiencies better than 20% as discussed by A. Giesen, et al., "Scalable concept for diode-pumped high-power solid-state lasers", Appl. Phys., Vol. B 58, 363 (1994) and J. Speiser, "Fifteen years of work on thin-disk lasers: results and scaling laws", IEEE J. Sel. Top. Quant. Electr., Vol. 13 (3), p. 598 (2007). FIG. 1 illustrates the concept consisting of a lasing thin disk (TD), a hemispherical resonator having back side of thin disk serving as a flat mirror, a cooled heat sink for the TD and the laser diode pump radiation coming from a parabolic multi-pass reflector assembly not shown as disclosed in U.S. Pat. Nos. 4,921,041; 6,438,152; 6,577,666; 6,963,592; 7,003,011; and 7,200,160. Although only a part of the pump beam is absorbed by the thin gain element, the pump efficiency can be optimized by re-imaging the pump radiation several times with an optical system of a parabolic mirror and redirecting mirrors. Up to 32 passes of the pump beam can be used with more than 90-98% of the pump power absorbed in the disk. The output laser power at kW levels is multi-transverse mode with M2 values from 5-20 and single, lowest order mode cw operation occurs only for a few 100's of watts.

Even with these impressive results, it is important to achieve much higher single mode laser operation with good beam quality (BQ) from thin disk lasers. Improved high power BQ operation of TDL would enable many more applications. The diminished BQ performance at high powers, however, is the most significant shortcoming of this promising laser technology and is caused by the thermal behavior of the lasing thin disk. As the TD is heated by the optical pumping radiation, it experiences non-uniform temperature profiles which creates a dynamic lens plus significant thermally-induced stress. These stresses produce both time and spatial varying birefringence in the disk that causes laser polarization changes and non-spatial phase changes across the thin disk. This polarization change and the phase changes, respectively, reduce the laser energy extraction from the thin disk and further degrade the TDL beam quality. All of these thermal problems are attributed to insufficient thermal management of the thin disk. To date, nearly all high power TDL use jet impingement cooling which produces a spatially non-uniform cooling of the thin disk. In this patent application, the use of a special variation of heat pipes produces significantly improved isothermal cooling of the thin disk that will lead to greatly improved beam quality plus good energy extraction from the thin disk laser. This invention should greatly expand the application of the TDL.

The main difference between TDL and conventional rod or slab lasers is the geometry of gain medium. For the TDL, the thickness of the laser crystal (or ceramic) is quite small, 100-200 μm and the diameter is typically 1-2 cm. The large surface-to-volume ratio of the thin disk like fiber lasers makes possible the efficient removal of heat from the TDt. As heat is removed via diffusion through the back side of the TD, the temperature distribution in the radial direction could be made quite uniform provided the central area of the disk is pumped by a near flat-top intensity profile and the diffusive cooling is very efficient. Today's operating TDL, however, do not have these ideal pumping and cooling conditions. The present invention deals with the thermal management of the thin disk in an attempt to achieve much more uniform and efficient conduction cooling for the TD's. The most commonly employed approaches for the thin disk lasers use jet impingement cooling of two configurations shown in FIG. 2. These types are the "cold plate" (or "cold finger") thin disk and the "capped" thin disk. In the former, the thin disk is bonded to a "cold plate" (usually 1 mm thick CuW for Yb:YAG lasing thin disk) which is cooled on the back side via water jet impingement. [D. J. Womac, "Correlating Equations for Impingement Cooling of Small Heat Sources with Single Circular Liquid Jets", Transactions of ASME, Vol. 115, p. 106 (1993)] In the "capped" thin disk, an approximate 1 mm thick, undoped crystal or polycrystalline ceramic (like YAG) is bonded to a thin disk like Yb:YAG. The Yb:YAG is then cooled directly to maximize the diffusion of heat through the 200 micron thick lasing material (Yb:YAG is this case) as disclosed in U.S. Pat. Nos. 6,600,763 and 7,200,216. The 1 mm thickness material provides mechanical strength for the nominal 200 micron laser gain material. The most widely used gain medium for TDL is Yb:YAG as discussed by C. Stewen, et al, "A 1-kW cw thin disc laser", IEEE J. Sel. Top. Quant. Electr., Vol. 6 (4), p. 650 (2000); K. Contag et al., "Theoretical modeling and experimental investigations of the diode-pumped thin disk Yb:YAG laser", IEEE J. Quant. Electr., Vol. 29 (8), p. 697 (1999); D. Kouznetsov, et al., "Surface loss limit of the power scaling of a thin-disk laser", J. of Opt. Soc. Amer., Vol. B-23 (6), p. 1074 (2006). Lately many other system has been demonstrated like Yb:KGW as discussed by G. Paunescu, et al., "100-fs diode-pumped Yb:KGW mode-locked laser", App. Phys. B, Vol. 79, p. 555 (2004); J. E. Hellstrom, et al., "Efficient Yb:KGW lasers end-pumped by high-power diode bars", Appl. Phys. B, Vol. 83, p. 235 (2006), Yb:KYW as discussed by K. Seger, et al., "Tunable Yb:KYW laser using a transversely chirped volume Bragg grating", Optics Express, Vol. 17 (4), p. 2341 (2009)] and Yb:$Lu_2O_3$ as discussed by R. Peters, et al., "Broadly tunable high-power Yb:$Lu_2O_3$ thin disk laser with 80% slope efficiency", Opt. Express, Vol. 15 (11), p. 7075 (2007).

Figure 2:
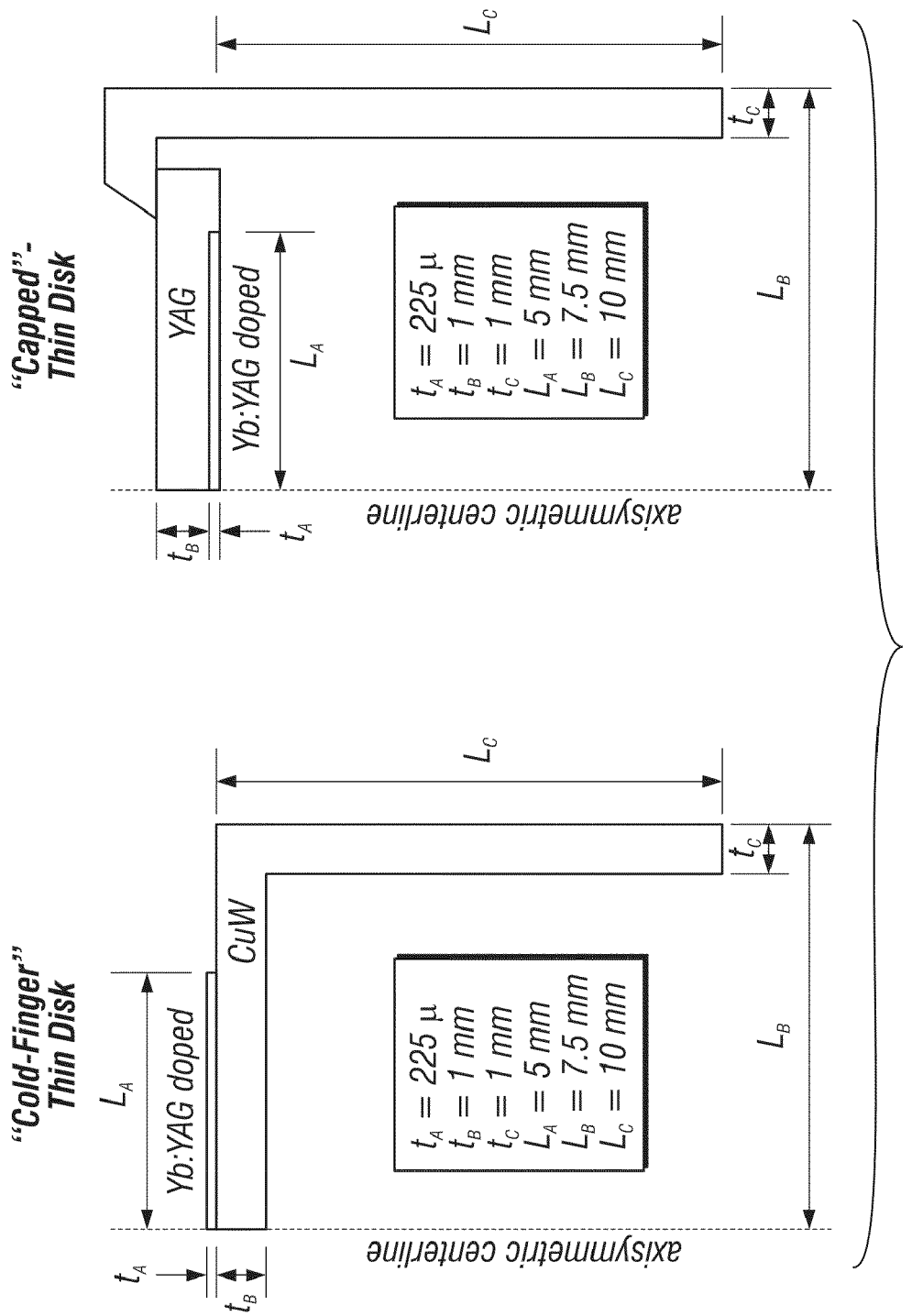
Figure 3:
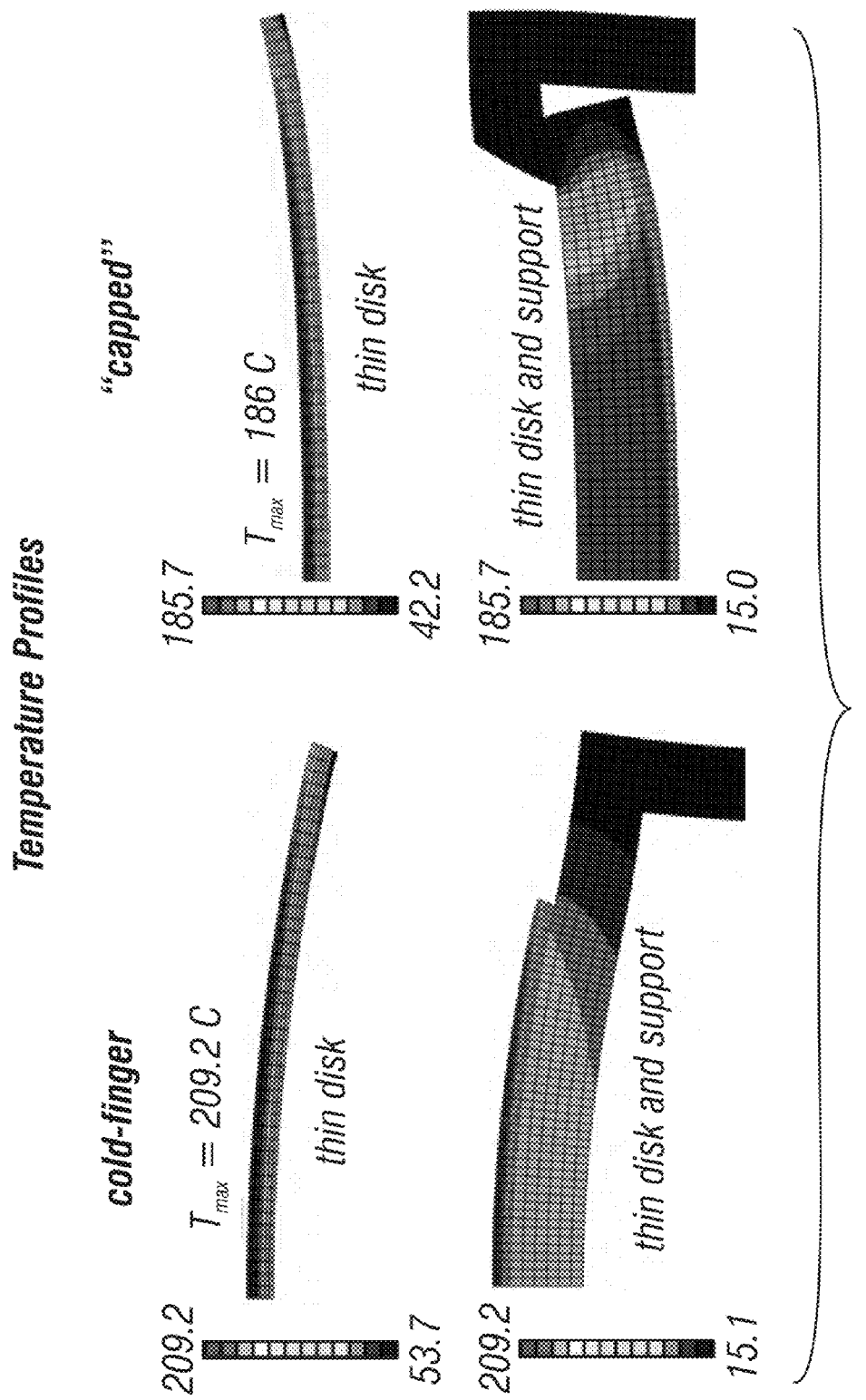
Figure 4:
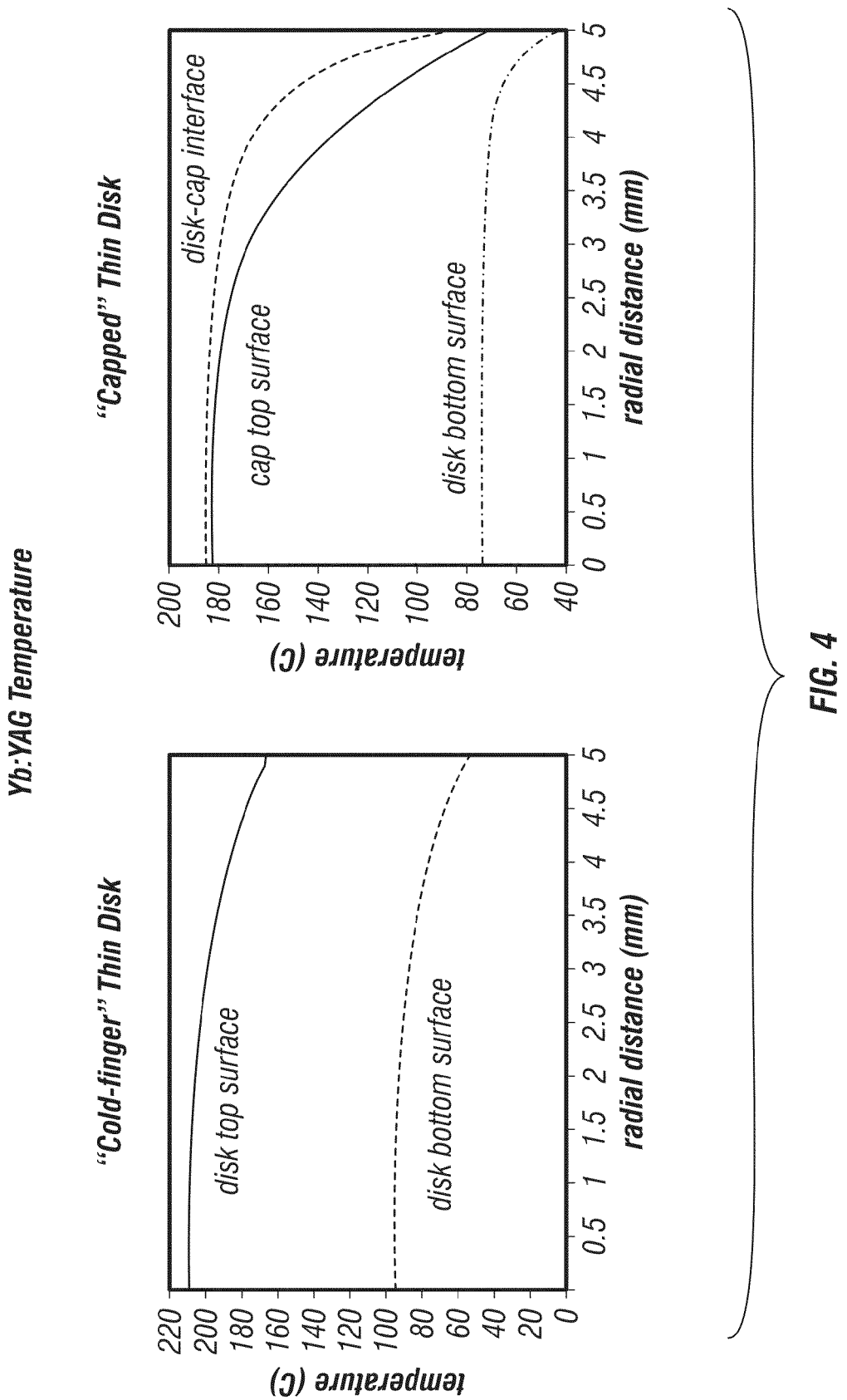
Figure 5:
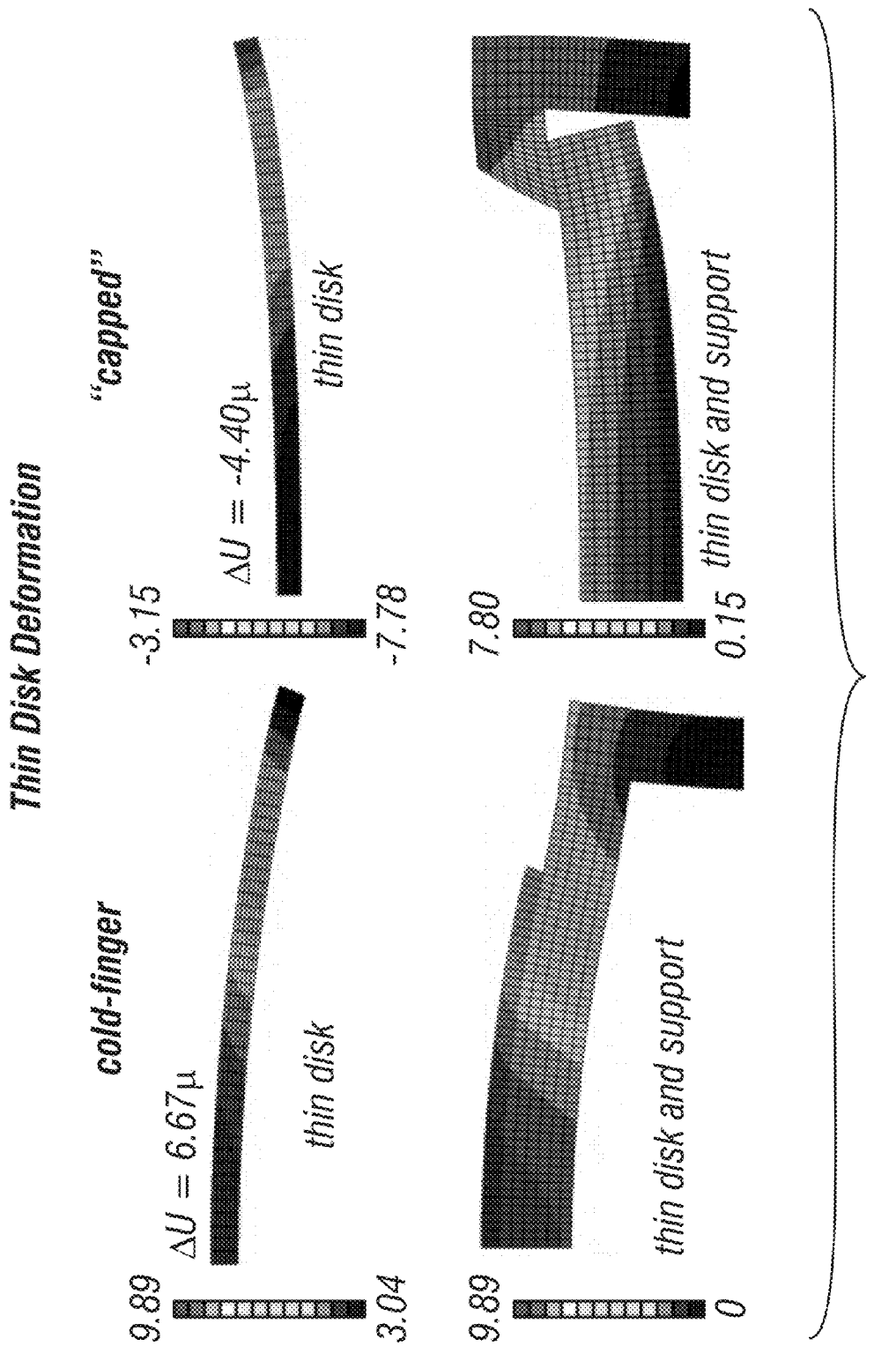
Figure 6:
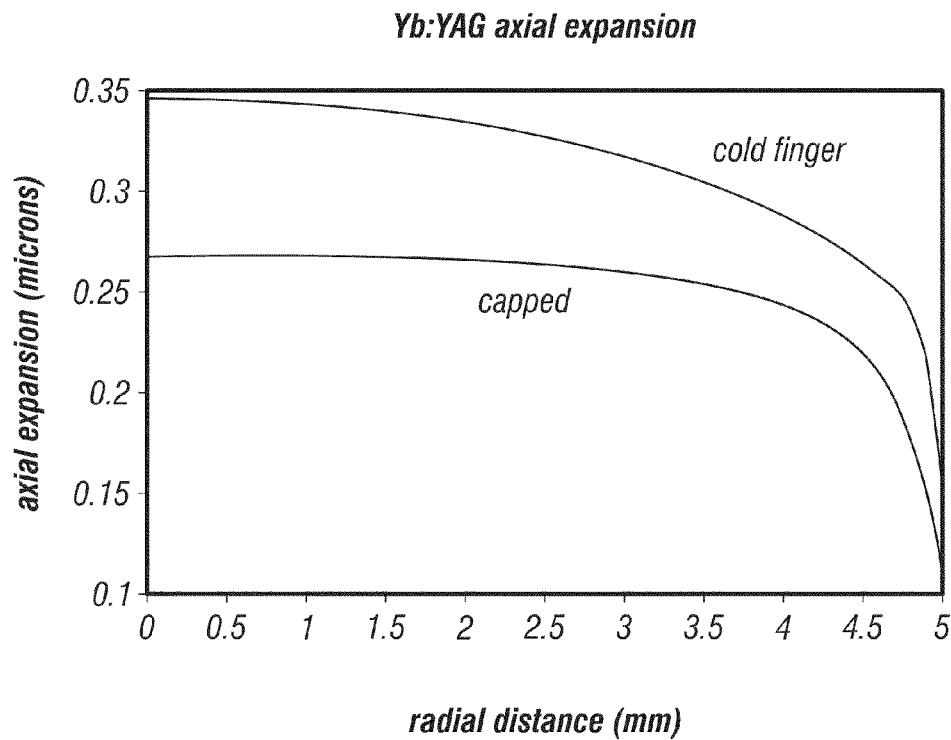

Unfortunately, as related above, non-optimum conduction cooling creates a non-uniform uniform temperature across the thin disk surface and in the TD itself as shown in FIG. 3 for the two specific geometric configurations shown in FIG. 2. Such non-isothermal temperature profile conditions cause a thermal lensing effect plus thermal-stress induced birefringence which results in the laser power decreasing due to depolarization loss. A thin disk of a high power TDL has very high power loading in the disk (up to 100's of kW/$cm^3$ absorbed pump power density). To date, approximately 100 W of output power in a diffraction-limited continuous-wave (CW) beam has been obtained with a single disk. Multimode TDL with 6.5 kW output power from a single disk has been demonstrated. [A. Lobad, et al., "Characterization of a Multikilowatt Yb:YAG Ceramic Thin-Disk Laser", J. of Directed Energy, March, 2011] The scaling laws show that the power limit for CW operation can be theoretically projected to be beyond 40 kW for one single disk. [J. Speiser, "Fifteen years of work on thin-disk lasers: results and scaling laws", IEEE J. Sel. Top. Quant. Electr., Vol. 13 (3), p. 598 (2007)] These non-uniform temperature profiles in a lasing crystal disk result in thermal distortion of the output beam and degradation of laser operation due to thermal stress induced birefringence and deformation in the thin disk. FIGS. 3 and 4 show the non-uniform temperature profile in the radial direction and the temperatures increases in the supporting structure for the TD. In FIG. 4, note the significant difference between the "cold-finger" and "capped" configurations of the Yb:YAG thin disk across the radial direction. These temperature variations for the entire thin disk holding assembly also cause significant deformation for the entire structure. FIG. 5 illustrates this effect for both TD configurations. FIG. 6 shows the axial expansion in a 1 cm pumped cross section versus the radius. Any laser beam propagating through this effective, thermally induced lens will create significant detrimental effects on the TDL's ultimate BQ and resulting performance.

Relation of OPD to Beam Quality: Thin Disk Temperature Control Needs

Besides the thermal lensing effects caused by non-uniform expansion of the thickness, the change of refractivity index (n) varies with the temperature of lasing thin disk. For a thin disk of thickness d having an integrated refractivity Δn along its axial direction (FIG. 7) and operating at a wavelength λ, the laser optical phase difference as a function of the radius. [K. M. Swift, R. D. Rathge and L. A. Schlie, "Dispersion of Gases in Atomic Iodine Lasers at 1.315 μm", Appl. Optics, Vol. 27, p. 4377 (1988)].

$$\Delta\phi(r) = 2\Omega^* \Delta n^* d/\lambda \tag{10}$$

Figure 9:
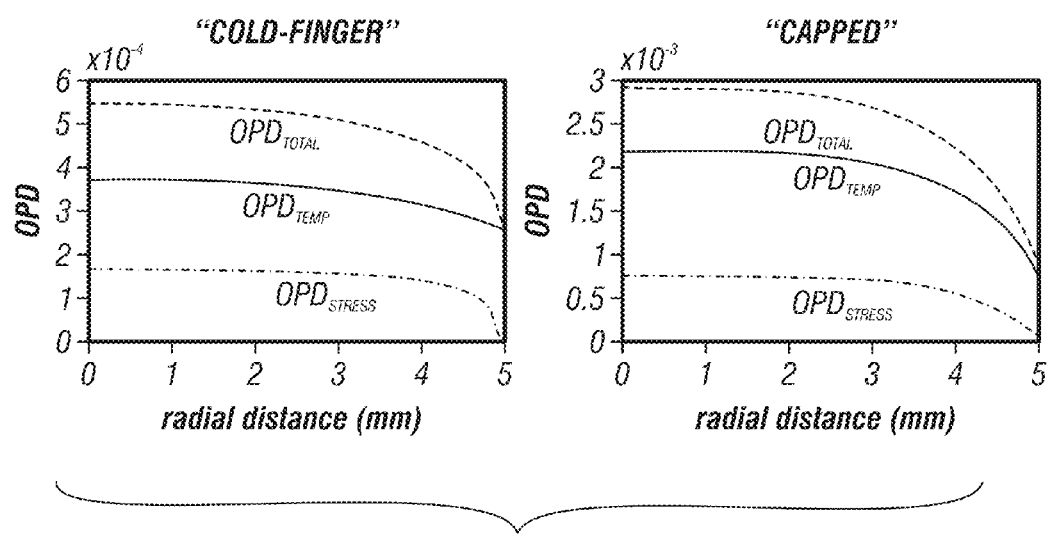

For a good beam quality, the condition $\Delta\phi \leq \lambda/10$ needs to exist. At room temperature for Yb:YAG, the thermal-optical coefficient dn/dT=9×10$^{-6}$/° K. [R. Wynne, et al., "Thermal Coefficients of the Expansion and Refractive Index in YAG", Appl. Opt., Vol. 38, p. 3182 (1999)] To achieve this condition that $\Delta\phi \leq \lambda/10$, the maximum temperature variation across the thin disk must be <20° K. A very good beam quality should have $\Delta\phi \leq \lambda/20$ and an excellent BQ should be $\Delta\phi \leq \lambda/50$ which corresponds, respectively, to temperature variations across the thin disk to be less than 10° K and 2° K. To meet this requirement, a very good thermal cooling method is required that can provide a much more uniform temperature distribution across and through the thin disk. The results of FIGS. 4-5 and 9 shown below clearly illustrate that jet impingement cooling will not improve the BQ for the TDL. Besides the degradation in BQ due to these non-uniform temperatures, the temporal variations of the temperature profiles will cause many different modes to have transient behavior and operation.

Heat generated during the operation of High-Average-Output (HAP) solid state lasers causes thermal distortion in the laser amplifier that can be detrimental if not properly controlled. The mode structure and quality of the output beam depends on the amount of volumetric heat deposited into the amplifier, the shape and geometrical configuration of entire laser system of the amplifier, the design of the amplifier's supporting structures, the amplifier's cooling system, and the thermal, mechanical and optical properties of the amplifier material. Non-uniform heating along with uneven cooling produces temperature gradients within the gain material. As a result, inhomogeneous optical properties develop and this, along with mechanical deformation (i.e., thermal lensing) plus thermal stresses within the medium can further degrade the quality of the beam output. If not properly controlled, thermally induced stress fracture can also occur, which ultimately limits the laser's maximum power output.

Significance of Thermo-Mechanical-Optical Effects

Figure 8:
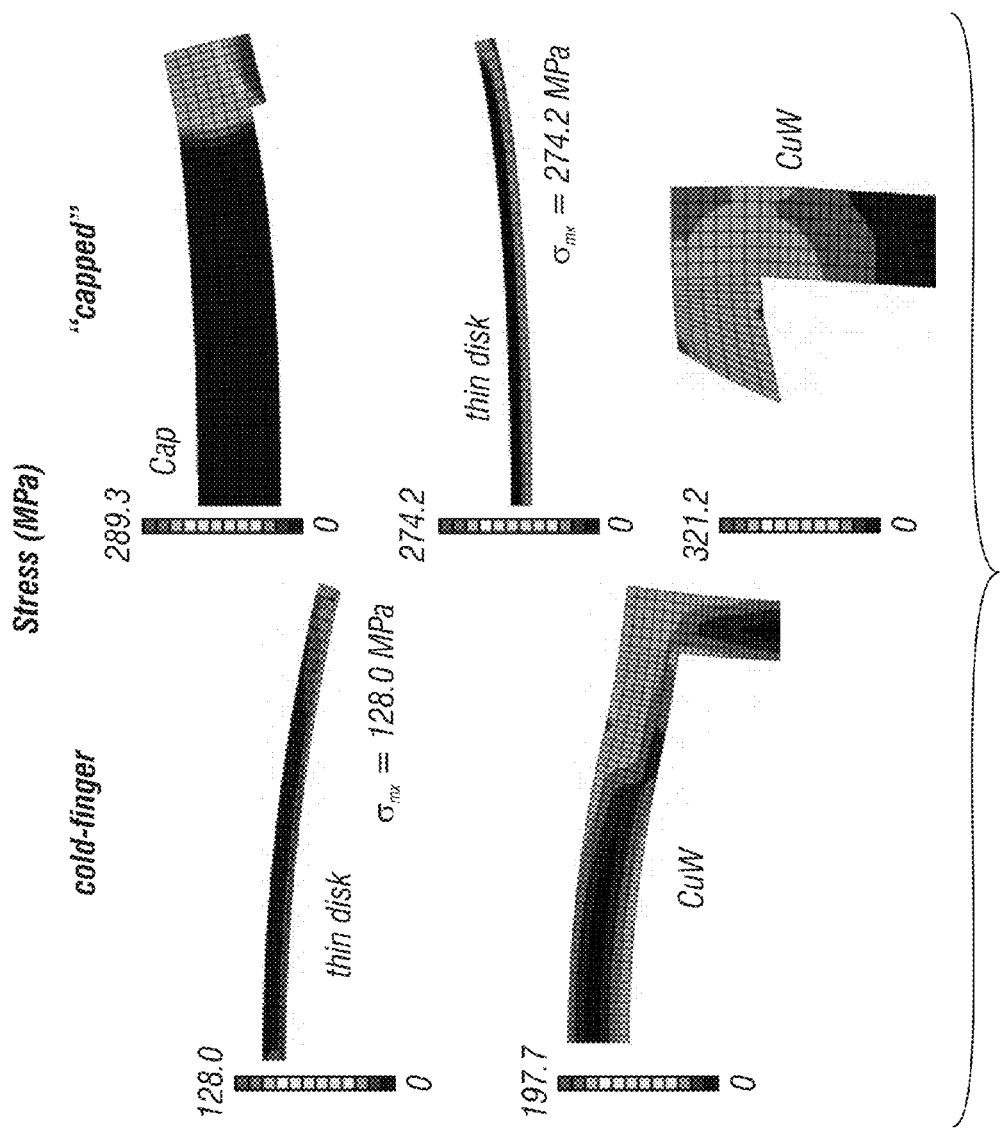

Thermally induced distortion and its effect on optical performance have been studied for rod amplifiers where classical linear theory considers constant thermal, mechanical, and optical properties within the gain material. Much of this work includes yttrium aluminum garnet (YAG) materials that are often used in HAP applications and addresses both steady state and pulsed laser operations. Optical distortions in YAG rod amplifiers caused by the dependence of the material's index of refraction on temperature T and stress σ and have been analyzed extensively. [D. C. Brown, "Nonlinear thermal distortion in YAG rod amplifiers", IEEE J. Quantum Electron., Vol. 34(12), p. 2383 (1998) and W. Koechner, Solid-State Laser Engineering, 6$^{th}$ Revision, Springer Series in Optical Sciences, New York, N.Y., 2006] FIG. 8 shows the associated stresses experienced by the two thin disk configurations for the temperature profiles of FIG. 3. More recently, measurements of the temperature dependent material properties (Yb:YAG) have enabled much more accurate analysis of the non-quadratic radial and tangential polarizations. [R. Wynne, et al., "Thermal Coefficients of the Expansion and Refractive Index in YAG", Appl. Opt., Vol. 38, p. 3182 (1999) and D. C. Brown, "Nonlinear thermal distortion in YAG rod amplifiers", IEEE J. Quantum Electron., Vol. 34(12), p. 2383, (1998)]. Unfortunately, analyses with temperature dependent properties do not yield simple analytical solutions and instead require a numerical approach such as the finite element method. Similarly, the geometry of the thin disk laser does not lend itself to analytical evaluations of distortion, especially since the design of the structure that mounts the thin disk affects its thermo-mechanical-optical response. [Y. Liao, et al., "Pressure tuning of thermal lensing for high-power scaling", *Opt. Lett.*, Vol. 24(19), p. 1343 (1999)]. Employing the thermo-mechanical properties in the numerical analysis of Yb:YAG yields the radial spatial optical path differences (OPD) experienced per pass. FIG. 9 shows these associated OPD results in Yb:YAG thin disks from the temperature profiles of FIG. 3 being excited at 5 kW/cm$^2$, the deformations of FIG. 5 and the birefringence resulting from the thermal stress of FIG. 8.

Moreover, the cooling technique must be very efficient and at high thermal energy fluxes (>kW/cm$^2$) in order to further increase laser output power. Increase of the pump power to produce higher laser output power naturally results in significantly more heating of the thin disks. The generated heat must be removed as quickly as possible. A good way to attack this issue is to enhance heat transfer from the heat sink by improving the heat sink design and utilizing an advanced thermal management approach. Advanced thermal management that can efficiently and quickly remove heat from TDL and make uniform temperature in a TDL is the most challenging issue for the next generation of high power TDL. The current thermal management technology is limited not only by the heat removal rate but also by the temperature uniformity. Currently, the achieved highest rate of heat removal from a TDL is approximately 0.3 kW/cm$^2$. Scaling the laser output power greater than 10 kW with very good single mode, high BQ thin disk laser operation, this heat removal can become more than 1-2 kW/cm$^2$.

In order to increase the heat removal capability and reach a higher level of temperature uniformity, cooling devices or systems based on phase change heat transfer have been widely utilized. For example, heat pipes are used in laptop or desktop computers. When heat continuously increases in high power TDL's, currently available cooling devices such as liquid cooling employing jet impingement cooling approaches cannot meet the requirement. This is attributed to the facts that the capillary limitation, boiling limitation, vapor flow effect, and thermal resistances occurring in the conventionally configured heat pipe wicks significantly limit the heat transport capability. Therefore, in order to develop a highly efficient cooling system to remove the extra-high heat flux and significantly increase the effective thermal conductivity, a novel mechanically controlled hybrid of advanced high power technology heat pipes is proposed and discussed in detail below.

Figure 10:
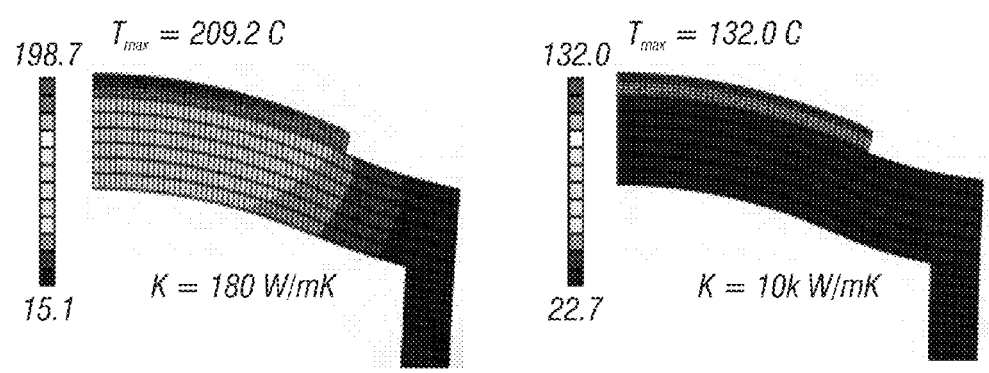
Figure 11A:
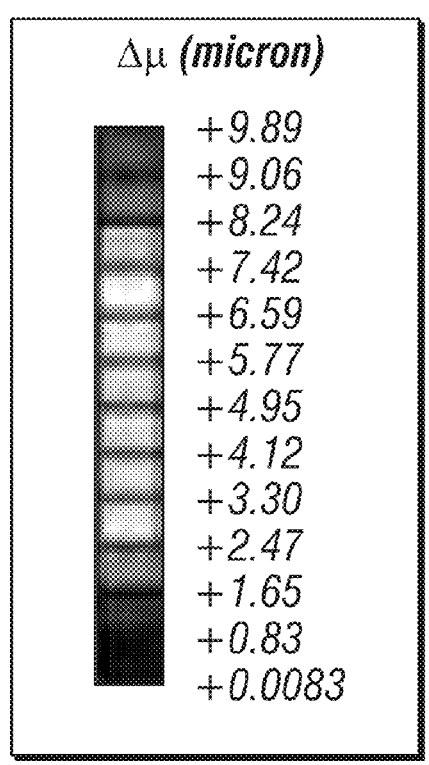
Figure 11A:
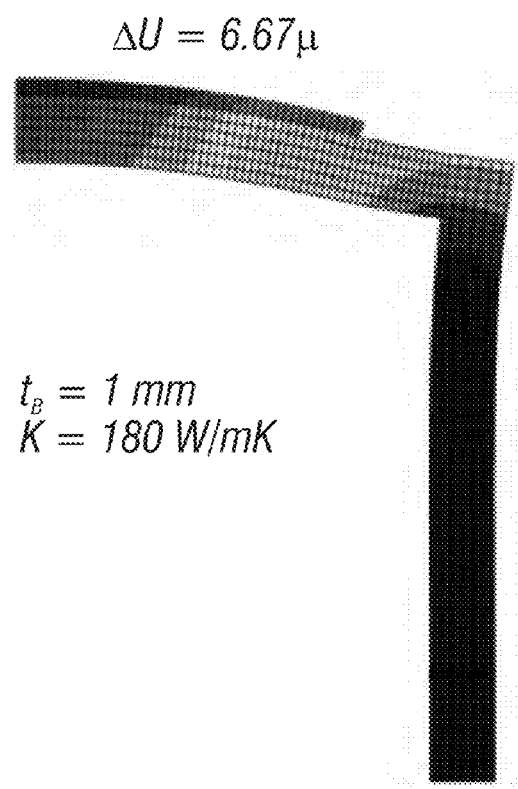
Figure 11B:
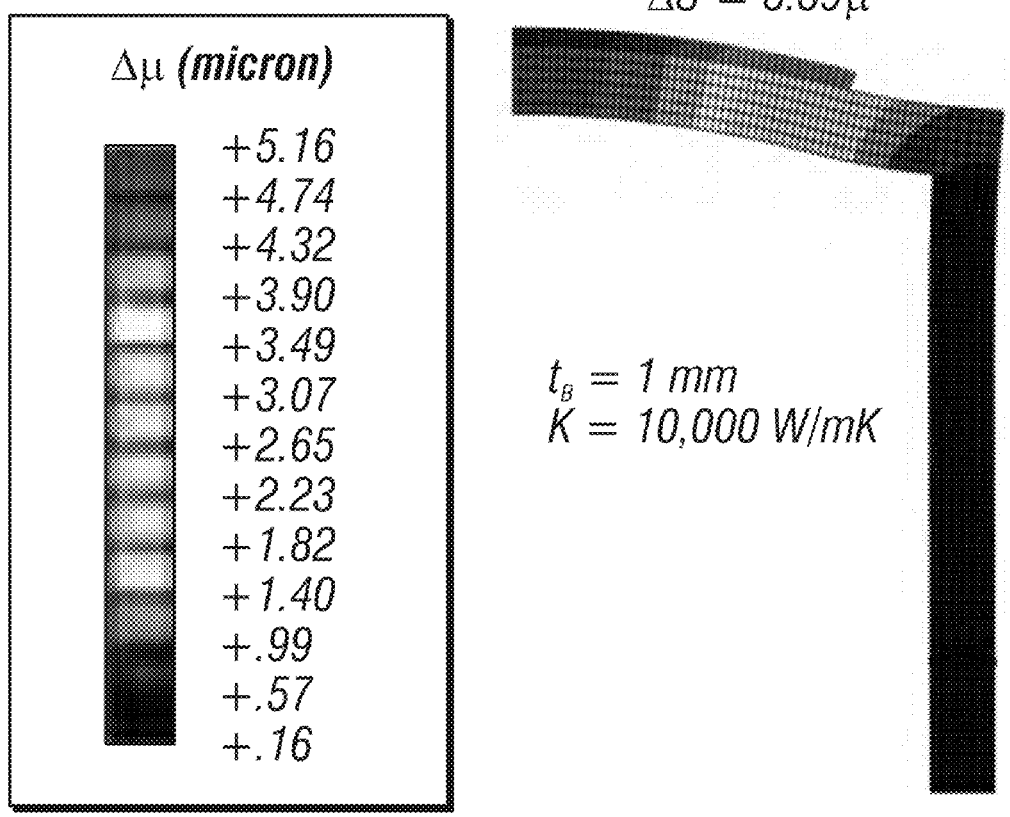
Figure 12A:
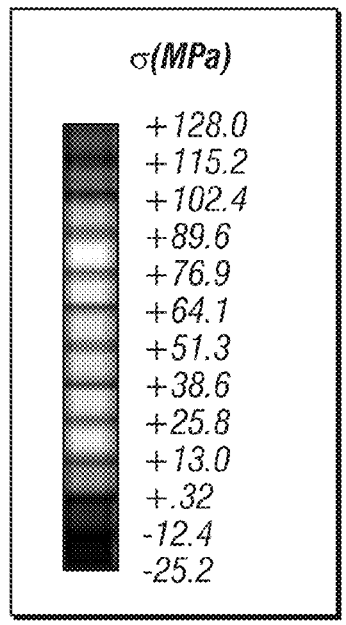
Figure 12A:
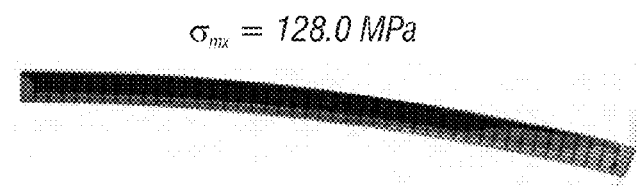
Figure 12A:
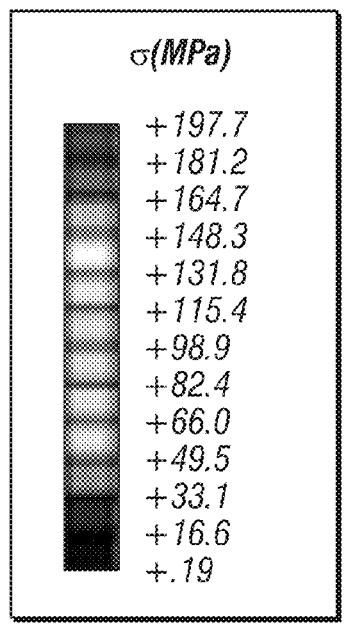
Figure 12A:
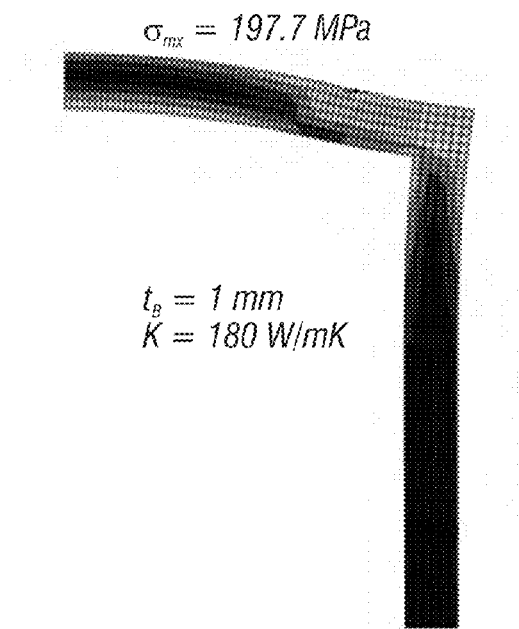
Figure 12B:
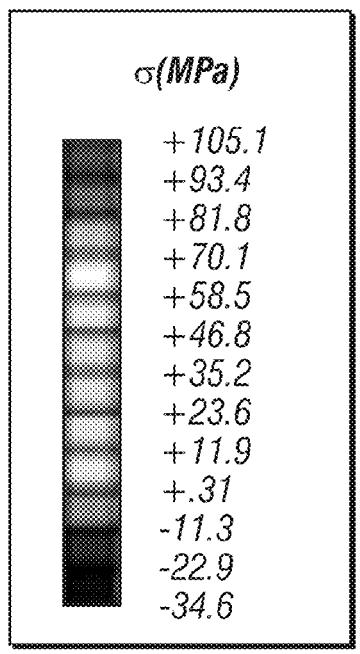
Figure 12B:
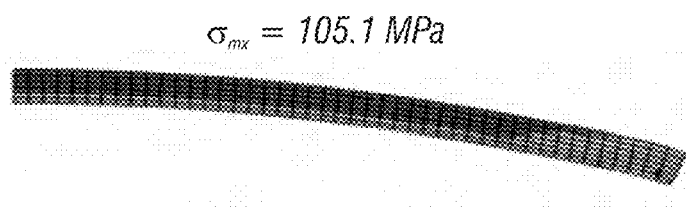
Figure 12B:
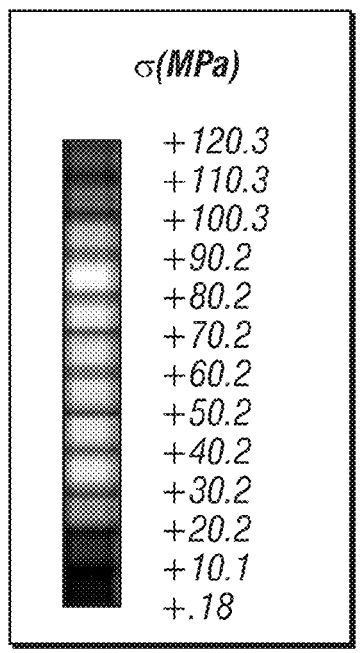
Figure 12B:
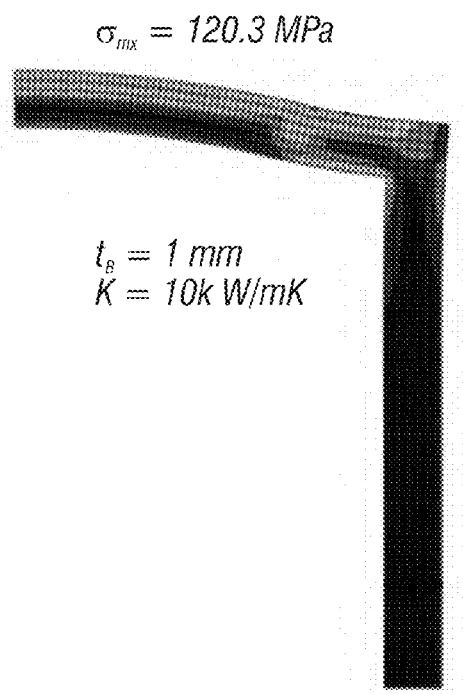
Figure 13:
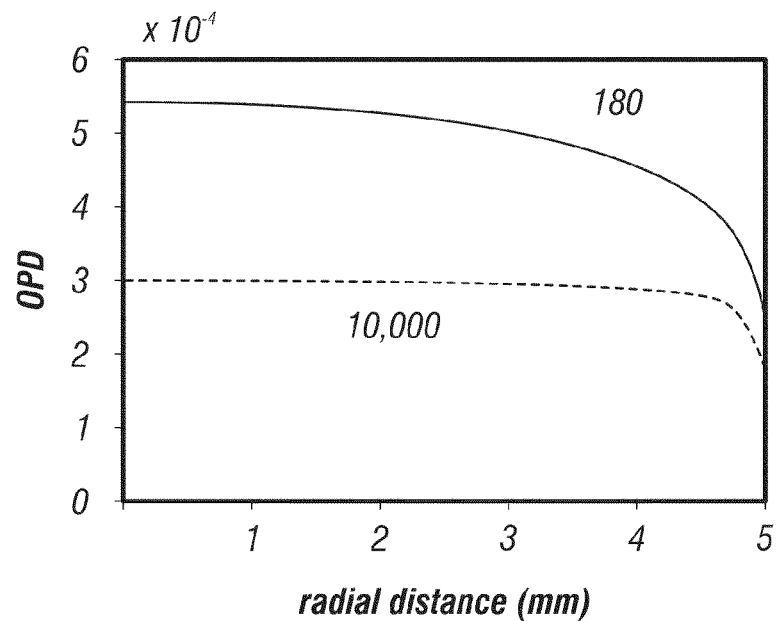

The value of the higher thermal conductivity from the advanced heat spreader highlighted above described in detail below are shown in FIG. 10 by the comparison of temperature profiles for the two different thermal conductivity, 180 (CuW) and 10,000 W/m*° K. For the latter, the temperature profile through the thin disk is very constant radially except for the very edge of the thin disk. FIGS. 11-12 show respectively the deformation and stress comparisons for these two different thermal conductivities of the effect heat spreaders. Also, note that the maximum temperature at the center of the thin disk is 77° K lower. FIG. 13 shows the corresponding OPD for the temperature profiles of FIG. 10 creating the deformations and stress induced birefringence. The nearly flat OPD clearly shows the real value of the advanced heat spreader to significantly improve the BQ of thin disk lasers. Operating an 80° K should make the BQ very good even at very high power loading. In addition, the de-polarizing losses in the thin disk due to stress-induced birefringence should be greatly decreased and maybe completely eliminated.

Advanced Thermal Management-Micro-Channeled, Closed Loop Oscillating Heat Pipe

Figure 14:
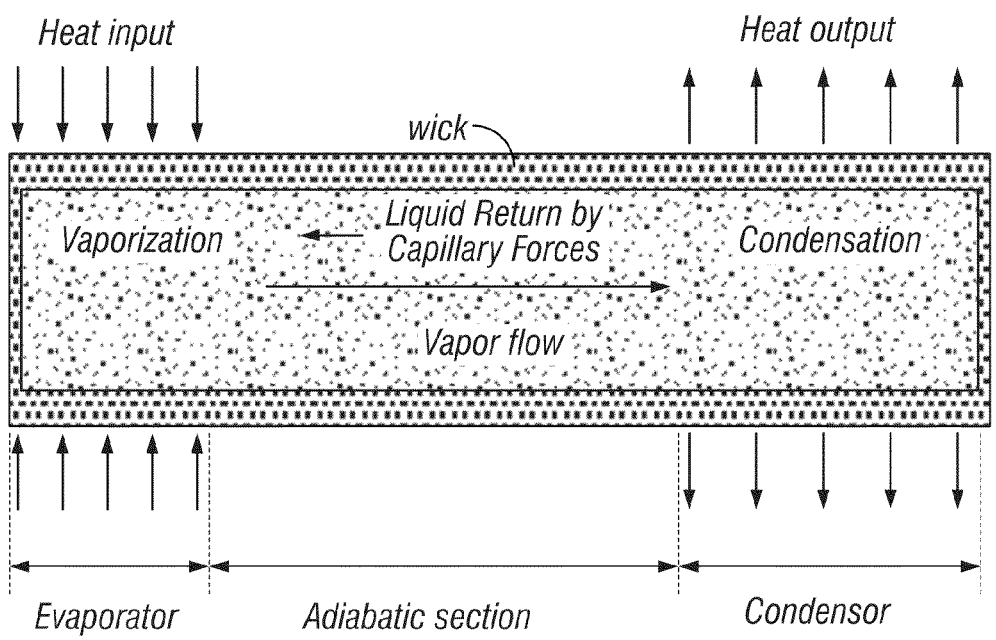
Figure 15:
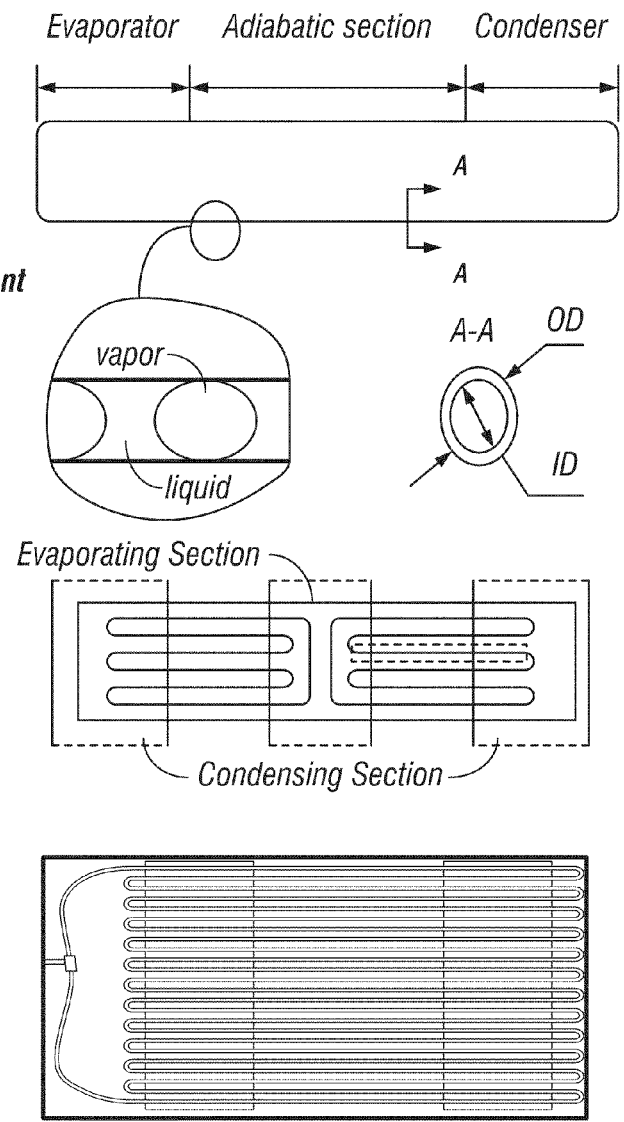

For the thermal management aspects of the advanced heat spreader (AHS) to be appreciated, first a discussion of main concepts must be described, namely, thin film evaporation, thermally excited oscillating motion, nanofluid, and nanostructure-modified wicks. The advanced heat spreader system uses capillary heat pipe (HP) action in closed, not open tubes that contain "wicks" to return working flow. FIG. 14 illustrates a conventional "wicked" heat pipe This AHS approach eliminates the reduction of working fluid flow by forcing a unidirectional flow. The large "effective" thermal conductivity is created as a result of the unidirectional flow (often aided by check-valve) and the evaporation—condensation action of working fluid (i.e., the latent heat of vaporization), a thermal process called "oscillating motion of the liquid plugs and vapor bubble". FIG. 15 shows the basic concept principle of oscillating heat pipes (OHP) which are described below. It should be noted that the "Heat Pipe Action" can be promoted by various "working fluids" such as water, acetone, ammonia and nitrogen (cryogenic operation) at room temperature (RT).

Thin Film Evaporation

In the presence of a thin film, a majority of heat will be transferred through a very small region. [M. A. Hanlon, et al., "Evaporation Heat Transfer in Sintered Porous Media," ASME Journal of Heat Transfer, Vol. 125, p. 644, (2003); S. Demsky, et al., "Thin film evaporation on a curved surface", Microscale Thermo-physical Engineering, Vol. 8, p. 285 (2004); H. B. Ma, et al., "Fluid Flow and Heat Transfer in the Evaporating Thin Film Region," Microfluidics and Nanofluidics, Vol. 4, No. 3, pp. 237-243. (2008).] When evaporation occurs only at the liquid-vapor interface in the thin-film region, in which the resistance to the vapor flow is negligible, evaporating heat transfer can be significantly enhanced, resulting in much higher evaporating heat transfer coefficient than boiling heat transfer coefficient with enhanced surfaces [S. G. Liter, et al., "Pool-boiling CHF Enhancement by Modulated Porous-Layer Coating: Theory and Experiment," *International Journal of Heat and Mass Transfer*, 44, pp. 4287-4311 (2001)]. Utilizing this information, a number of high heat flux heat pipes have been developed at the University of Missouri (MU). For example, a micro-grooved heat pipe, 6-mm diameter and 135-mm length produces a temperature drop of only 2° C. from the evaporator to the condenser under a heat input of 50 W. Another example is the air-cooled aluminum heat pipe which can remove a total power of 200 W with a heat flux up to 2 MW/m$^2$. Utilizing and optimizing thin film regions significantly increases the heat transport capability and effectively increase the effective thermal conductibility of the vapor chamber.

Oscillating Motions and Oscillating Heat Pipes

Oscillating single-phase fluid significantly enhances heat and mass transfer in a channel, and has been employed in a number of heat transfer devices. [S. Backhaus, et al., "A Thermo-acoustic Stirling Heat Engine," *Nature*, Vol. 399, p. 335 (1999); U. H. Kurzweg, "Enhanced Heat Conduction in Fluids Subjected to Sinusoidal Oscillations," ASME *Journal* of *Heat Transfer*, Vol. 107, p. 459 (1985); U. H. Kurzweg et al., "Heat Transfer by High-Frequency Oscillations: A New Hydrodynamic Technique for Achieving Large Effective Thermal Conductivities," *Physics Fluids*, Vol. 27, p. 2624 (1984); M. Kaviany, "Performance of a Heat Exchanger Based on Enhanced Heat Diffusion in Fluids by Oscillation: Analysis," ASME *Journal of Heat Transfer*, Vol. 112, p. 49 (1990); M. Kaviany, et al., "Performance of a Heat Exchanger Based on Enhanced Heat Diffusion in Fluids by Oscillation: Experiment," ASME *Journal of Heat Transfer*, Vol. 112, p. 56]. The oscillating motions generated by a variable-frequency shaker could result in thermal diffusivity for up to 17,900 times higher than those without oscillations in the capillary tubes; however, the use of mechanically driven shakers may limit its applications to miniature devices. Akachi [U.S. Pat. No. 4,921,041 5,219,020] pioneered a new device, called oscillating heat pipe (OHP), which utilizes the pressure change in volume expansion and contraction during phase change to excite the oscillation motion of the liquid plugs and vapor bubbles. This results in four unique features that do not exist in regular heat pipes: 1) OHP is an "active" cooling device, in that it converts intensive heat from the high-power generating device into kinetic energy of fluids in support of the oscillating motion; 2) liquid flow does not interfere with the vapor flow in high heat removal because both phases flow in the same direction; 3) the thermally-driven oscillating flow inside the capillary tube will effectively produce some "blank" surfaces that significantly enhance evaporating and condensing heat transfer; and 4) the oscillating motion in the capillary tube significantly enhances forced convection in addition to the phase-change heat transfer. Because of these features, the OHP has been extensively investigated in the past several years [H. B. Ma, et al., "Temperature Variation and Heat Transfer in Triangular Grooves with an Evaporating Film," *AIAA Journal of Thermophysics and Heat Transfer*, Vol. 11, p. 90 (1997); K. Park, et al., "Nanofluid Effect on the Heat Transport Capability in a Well-Balanced Oscillating Heat Pipe," AIAA Journal of Thermophysics and Heat Transfer, Vo. 21, No. 2, p. 443 (2007); H. B. Ma, et al., "Heat Transport Capability in an Oscillating Heat Pipe," ASME *Journal of Heat Transfer*, Vol. 130, No. 8, p 081501 (2008); S. M. Thompson, et al., "Experimental Investigation of Miniature Three-Dimensional Flat-Plate Oscillating Heat Pipe," ASME Journal of Heat Transfer, Vol. 131 (4) (2009); Y. Zhang, et al., "Heat Transfer in a Pulsating Heat Pipe with Open End," *International Journal of Heat and Mass Transfer*, 45, pp. 755-764 (2002)]. Additionally, there has been cryogenic demonstrations of oscillating heat pipes. [H. Xu, et al., "Investigation on the Heat Transport Capability of a Cryogenic Oscillating Heat Pipe and Its Application in Achieving ultra-Fast Cooling Rate for Cell Verification Cryopreservation," Cryobiology, Vol. 56, pp. 195-203 (2008)]. The results are so promising that the combination of high-conducting nanofluids with OHP will further the energy carrying capacities. But the current oscillating heat pipe operating only by the thermal excitation cannot produce an extra high level of oscillating frequency. As a result, it is not possible to remove higher thermal heat power flux level more than 0.3 kW/cm$^2$. A mechanically-controlled oscillation motion of two phase flow is shown herein.

High Heat Transport Capability of Nanofluids

Figure 16:
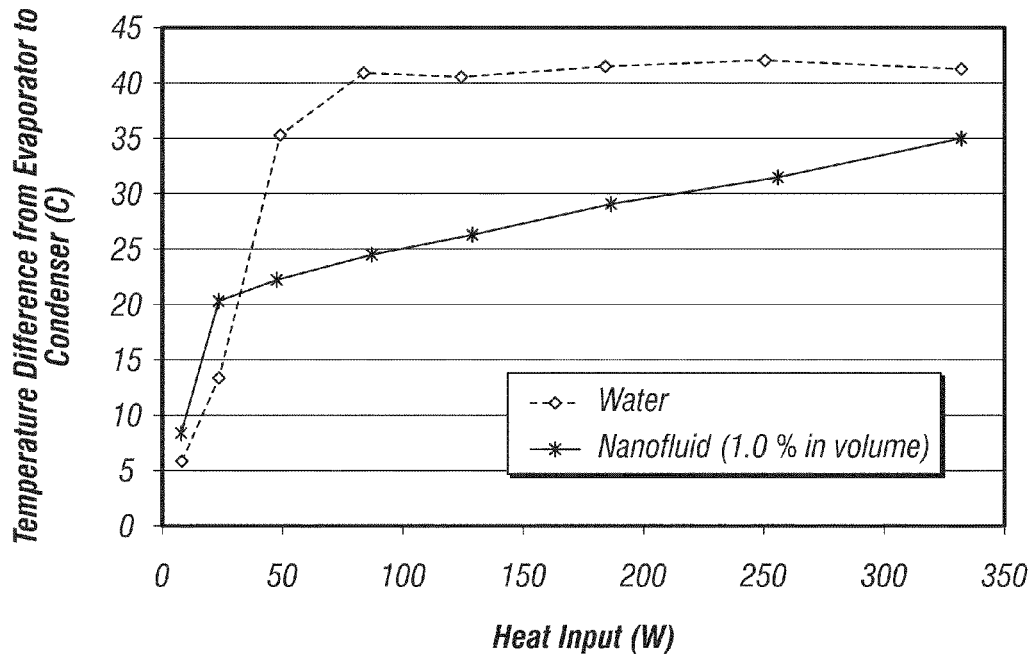
Figure 17:
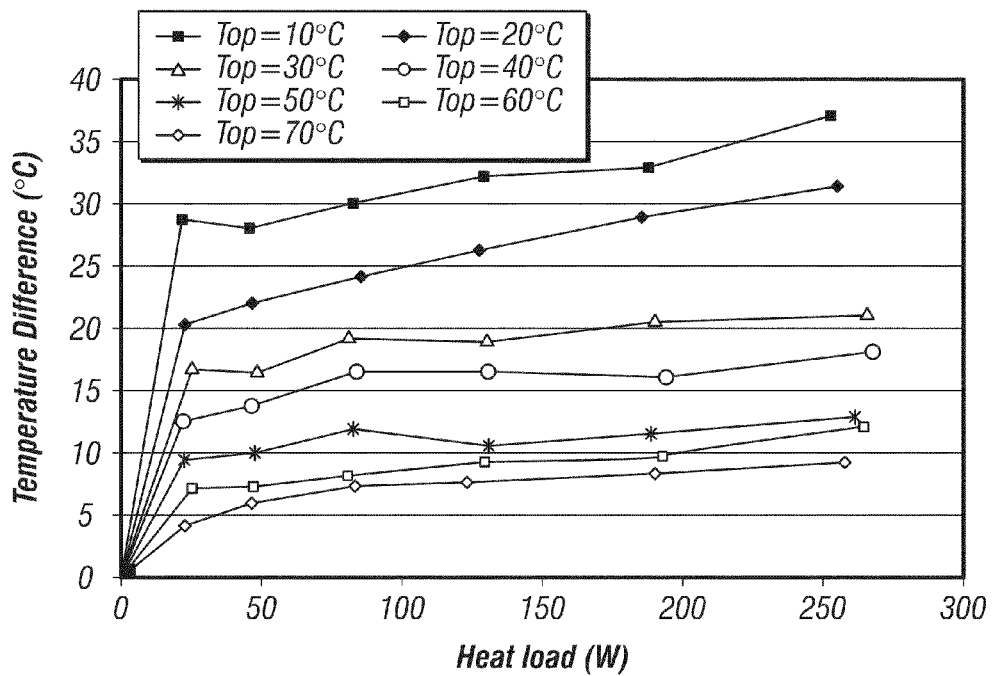
Figure 18:
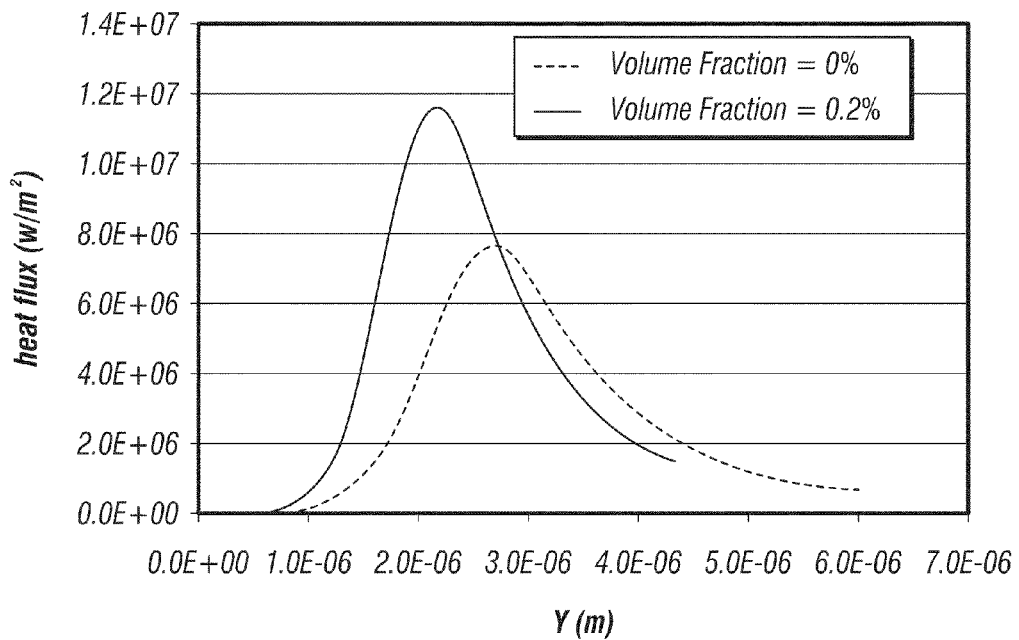

High heat transport capability of nanofluids produced by adding only a small amount of nanoparticles into the fluid has qualified nanofluids as a most promising candidate for achieving ultra-high-performance cooling. It has been demonstrated that the dispersion of a tiny amount of nanoparticles in traditional fluids dramatically increases their thermal conductivities. [H. B. Ma, et al., "An Experimental Investigation of Heat Transport Capability in a Nanofluid Oscillating Heat Pipe," ASME Journal of Heat Transfer, Vol. 128, p. 1213 (2006); H. B. Ma, et al., "Nanofluid Effect on the Heat Transport Capability in an Oscillating Heat Pipe," Applied Physics Letters, Vol. 88 (14), p. 1161 (2006); H. B. Ma, et al., "An Investigation of Oscillating Motions in a Miniature Pulsating Heat Pipe," Microfluidics and Nanofluidics, Vol. 2, No. 2, pp. 171-179 (2006); K. Park, et al., "Nanofluid Effect on the Heat Transport Capability in a Well-Balanced Oscillating Heat Pipe," AIAA Journal of Thermophysics and Heat Transfer, Vo. 21, No. 2, p. 443 (2007)]. Since 1995, outstanding discoveries and seminal achievements have been reported in the emerging field of nanofluids. The key features of nanofluids discovered so far include (a) thermal conductivities far above those of traditional solid/liquid suspensions [J. A. Eastman, et al., "Anomalously Increased Effective Thermal Conductivities of Ethylene Glycol-Based Nano-Fluids Containing Copper Nano-Particles," *Applied Physics Letters*, Vol. 78, p. 718 (2001)]; (b) a nonlinear relationship between thermal conductivity and concentration [S. Choi, et al., "Anomalous Thermal Conductivity Enhancement in Nano-tube Suspensions," *Applied Physics Letters*, Vol. 79, p. 2252 (2001)]; (c) strongly temperature-dependent thermal conductivity [S. K. Das, et al., "Heat Transfer in Nanofluids—A Review," Heat Transfer Engineering, Vol. 27(10), p. 3 (2006)]; and (d) significant increase in critical heat flux (CHF) [Y. Xuan, et al., "Investigation on Convective Heat Transfer and Fluid Features of Nanofluids," *Journal of Heat Transfer*, 125, pp. 151-155 (2003); I. C. Bang, et al., "Boiling heat transfer performance and phenomena of $Al_2O_3$-water nano-fluids from a plain surface in a pool," International Journal of Heat and Mass Transfer, Vol. 48 (12), p. 2407 (2005)]. These key features make nanofluids strong candidates for the next generation of coolants to improve the design and performance of thermal management systems. Most recently, nanofluids were put into an oscillating heat pipe (OHP) and it was found that nanofluids significantly enhance the heat transport capability in the OHP. [Y. Zhang, et al, "Nano-particle Effect on the Thermal Conductivity of Nanofluids,": International Journal of Heat and Mass Transfer, Vol. 51 (19-20), p. 4862 (2008)]. As shown in FIG. 16 when the nanofluid (HPLC grade water containing 1.0 vol. % 5-50 nm of diamond nanoparticles) was charged to the OHP, the temperature difference between the evaporator and the condenser can be significantly reduced. For example, when the power input added on the evaporator is 100 W, the temperature difference can be reduced from 42° C. to 25° C. It appears that the nanofluid can significantly increase not only the effective thermal conductivity, but also the convection heat transfer and the thin film evaporation in the OHP. The heat transport capability in the nanofluid OHP depends on the operating temperature. When the operating temperature increases, the heat transport capability significantly increases. And the temperature difference between the evaporator and condenser as shown in FIG. 17 was almost constant as the input power increases, and the investigated OHP with charged nanofluids can reach 0.028° C./W at a power input of 336 W, which might set a record of thermal resistance in the similar cooling devices. FIG. 18 shows the effect of nanoparticles on the thin film evaporation of the working fluid within the OHP.

BRIEF SUMMARY OF THE INVENTION

The present invention is of an integrated high power thin disk laser and a novel heat spreader having effective thermal conductivity $K_{eff} \cong 10\text{-}20,000$ W/m*K, which enables greatly improved thin disk laser (TDL) performance, as well as concomitant methods. The near isothermal behavior applied using this heat spreader on the lasing thin disk greatly reduces TDL dynamic focusing, temperature induced-stress-birefringence resulting in potential TDL laser beam quality performance. The heat exchanger employs a mechanically controlled, two phase oscillating motion of the working fluid of heat pipe to achieve much higher effective thermal conductivity and resultant heat transfer, greater than $kW's/cm^2$, a value never before conceived nor demonstrated. Further enhanced performance is achieved via use of nanoparticles and nano-fluids dispersed in the working fluid to acquire the near isothermal control of the thin disk laser. In addition, this integrated laser—unique heat pipe thermal management system allows good CTE (coefficient of thermal expansion) between the various optical components in the lasing thin disk assembly. This condition exists since the material used to make the heat pipe system can be made from basically any material including the laser material itself as like Yb:YAG lasing material and ceramic YAG, an arrangement which could provide nearly perfect CTE matching over the entire operating temperature range from sub-cryogenic to greater than room temperatures. Applications of this novel heat spreader can be implemented with other solid-state lasers and optical system components.

The effects of temperature variations in the lasing thin disk shown in FIG. 3 create conditions not desirable for achieving good BQ in TDL and single transverse mode operation. These effects, namely (1) transient dynamic focus, (2) OPD difference across the thin disk, (3) deformation of the thin disk and its supporting structure and (4) the stress induced birefringence are the reason for poor BQ and multi-transverse mode operation. Since all of the effects are directly attributable to the temperature variation across and throughout the thin disk and its supporting mechanical structure, it is important to have an alternate thermal management system for the thin disk to create nearly isothermal temperature control. Direct jet impingement cooling of the thin disk will not fulfill the need. The desired features can be achieved using a "Heat Spreader" having an effective, very large thermal conductivity K=10-20,000 W/m*K as shown in FIGS. 10-13. Such a "Heat Spreader" would provide a nearly isothermal temperature profile in the lasing thin disk. The analysis of temperatures in the TD plus the deformations, OPD's (meaning integrated refractivities ($\Delta$n) in the axial lasing direction in the thin disk and low stress-induced birefringence clearly illustrate the value of such of a "heat spreader". These excellent optical conditions are very conducive to produce a good BQ, single transverse mode operation at high power for a thin disk laser. Previously, a much lower power, heat pipe having micro-surface capillaries was shown to give somewhat similar thermal conductivities but it is limited to a maximum heat transfer of 25-50 watts, an operation never suitable for higher power laser requiring heat transfer of greater than this and sometimes more than a $kW/cm^2$. [U.S. Pat. Nos. 6,158,502 and 6,167,948]

Figure 19A:
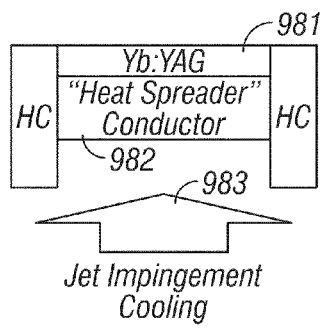
Figure 19B:
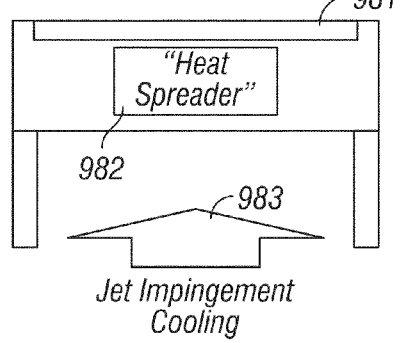
Figure 20:
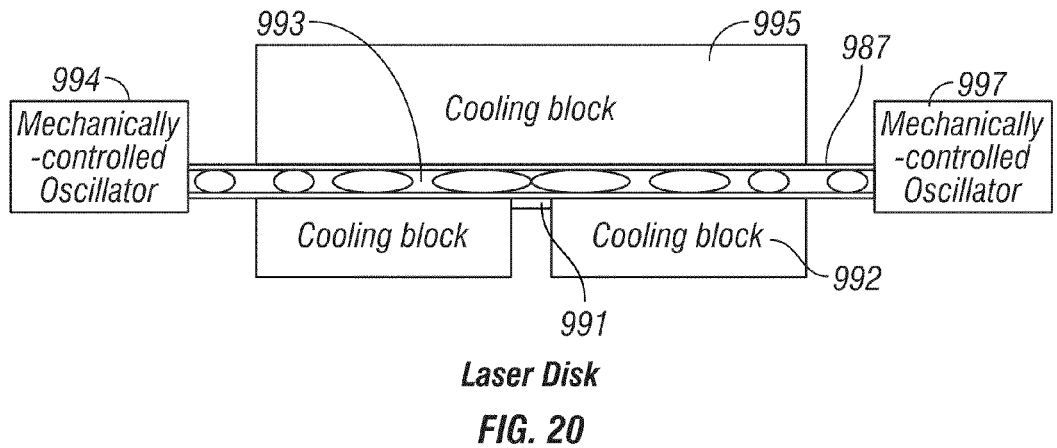

The general method of making such a "heat spreader" is to use a "mechanically-controlled, two-phase heat pipe as shown in FIGS. 19-20. The properties of this novel—high performance system are listed below. Unique features include:

The mechanically-controlled two-phase oscillating motion can reach a very high flow rate, which can reach an extra high level of temperature uniformity resulting in higher than all other kinds of heat pipes including the standard vapor chamber.

The hybrid system utilizes both the sensible and latent heats to transport heat from the hot area to the cold area while the conventional heat pipes including the vapor chamber transport heat only by the latent heat. Due to the latent heat, the temperature distribution can reach a high level of uniformity. Nanostructures used modify the evaporating surface and maximize the thin film evaporation, resulting in an unprecedented evaporating heat transfer rate.

Due to the oscillating motion, the nanofluid can be used, which significantly increase the heat transport capability.

The plasma-nano-coated surface can modify and improve the condensing surface resulting in high condensing heat transfer rate.

Due to the two phase system, the pressure drop is much lower than that of single liquid phase, which produces an extra high flow rate.

The hybrid system effectively integrates extra high level of heat transfer rate of thin film evaporation, high thermal transport capability of nanofluids, low pressure drop, and strong oscillating motions controlled by mechanical system, which results in an extra high heat transport capability.

In addition to the phase change heat transfer, the strong oscillating motion of nanofluids existing in this hybrid system will result in additional vortex in the liquid plugs that significantly enhancing the heat transfer rate.

Advanced Heat Pipe Manufacturing

In addition to the proposed directions to increase the rate of heat removal from the thin disk, there are two more methods that optimize operation of the heat spreader. First, several materials with high values of heat conductivity are utilized to produce the heat spreader prototypes. Criterion for this optimization is to achieve the highest heat removal rate. The heat-pipe elements from those materials are produced by femtosecond laser micromachining that is not sensitive to mechanical properties of those materials. This approach allows removing most requirements on mechanical properties of the materials characteristic of the currently employed mechanical machining methods and employing several non-standard materials for production of the heat-spreader prototypes. In particular, silicon nitride ceramics are used for prototype fabrication since they have demonstrated outstanding thermal properties combined with extremely low CTE. The high hardness of the ceramics limits accuracy and quality of their mechanical machining preventing fabrication of microstructures (e.g., micro-channels) on them.

Secondly, the design of the heat pipe is also optimized employing the unique capabilities of femtosecond laser micromachining providing excellent quality and precision of micro-machining. Recently, a prototype of a micro-channel was fabricated on a thin glass plate at the femtosecond laser facility of CoE Center of Ultrafast, Ultraintense Lasers (CUUL) at the University of Missouri. That result demonstrates the unique capability to make several thin or ultra-thin plates with the heat pipes and stack them together to increase the heat removal rate. The unique capabilities of the femtosecond micromachining allow other multiple ways to optimize the heat spreader design, e.g., by decreasing size of the micro-channels and making them of complicated shape.

Detailed Description of Advanced Heat Spreader

Figure 21:
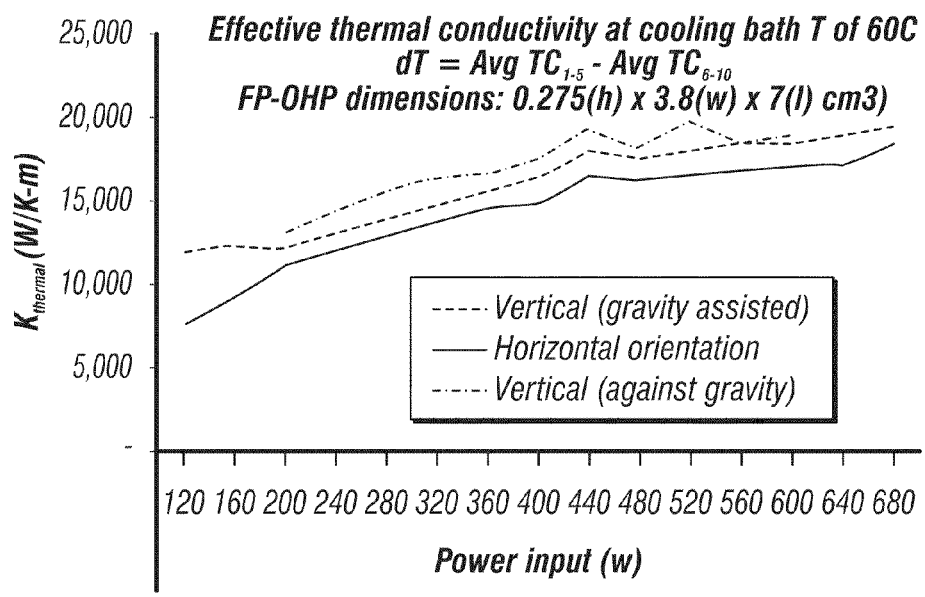

In FIG. 21 shows recent data on the performance of a newly developed oscillating heat pipe (OHP) by Prof. Ma's group at MU. It shows the first demonstration of an oscillating heat pipe having a thermal conductivity greater than 10,000 W/m*° K. This particular referred to as three-dimensional, flat plate oscillating heat (3D-FP-OHP), shown in FIG. 22, was tested in the following procedure: Heat was applied by a 1 square inch heating element on one side of the heat spreader's evaporator section, and heat was removed from both sides of the spreader's condenser section with good insulation surrounding the adiabatic sections. Two cooling blocks attached to one side of the spreader's condenser area, respectively, with constant 60° C. incoming coolant. The oscillating heat pipe has a dimension of 13 cm×4 cm and 0.3 cm. [S. M. Thompson, et al, "Effect of Localized Heating on Three-Dimensional Flat-Plate Oscillating Heat Pipe", J. of Heat Transfer, Vol. 131 (4), 2009]. The key to fast flow is due to narrow grooves, nominally 700 microns diameter. The method for making such a "heat spreader" at higher powers, kW/cm², and preferred for a high power thin disk laser, is to use a "mechanically-controlled, two-phase heat pipe as shown in FIG. 20. An integrated high power thin disk laser and a novel heat spreader having effective thermal conductivity $K_{ef}\approx 10\text{-}20{,}000$ W/m*K enables greatly improved thin disk laser (TDL) performance. The near isothermal behavior of the heat exchanger (really "heat spreader") on the lasing thin disk will greatly reduce the TDL dynamic focus, temperature induced-stress-birefringence resulting in potential TDL laser beam quality performance. The heat exchanger employs a mechanically controlled, two phase oscillating motion of the working fluid of heat pipe to achieve much higher effective thermal conductivity and resultant heat transfer, greater than kW/cm², a value never before conceived or demonstrated. Further enhanced performance is achieved via use of nanoparticles and nano-fluids inside of the working fluid to acquire the near isothermal control of the thin disk laser. In addition, this integrated laser—unique heat pipe thermal management system allows good CTE (coefficient of thermal expansion). This condition exists since the material used to make the heat pipe system can be made from basically any material including the laser material itself as like Yb:YAG lasing material and ceramic YAG, an arrangement which could provide nearly perfect CTE over the entire operating temperature range from sub-cryogenic to greater than room temperatures.

Design of Advanced Heat Spreader System

Due to the limitations existing in the conventional single phase flow, vapor chamber, and oscillating heat pipe, a novel mechanically-controlled hybrid oscillating two-phase system, as shown in FIG. 20, is described, which consists of a 3-D mechanically-controlled two-phase nanofluid oscillating flow and thin film evaporation. The design utilizes the extra-high evaporating heat transfer of thin film evaporation, strong oscillating motion, higher heat transport capability of nanofluids, and nanostructure-modified surfaces and wicks to significantly increase the heat transport capability in the proposed hybrid phase-change heat transfer device. FIG. 20 illustrates one specific design of the hybrid mechanically-controlled oscillating two-phase system. In order to form a very strong oscillating motion with high frequency, the oscillating motion will be mechanically controlled using fluid pumps including piezo-electric actuated pumps. A train of vapor bubbles and liquid plugs will flow through the channel with high speed. The channel wall 987, which can be fabricated from a microstructured wick, also acts as an evaporating surface. The channel shape, channel arrangement, and channel number will depend on the total power, heat flux level, and heat sources. The open region between the liquid plugs will have an extra fast evaporation rate through nanostructure wicks. The pore size in the evaporating section is optimized in order to have the maximum number of the thin film regions, excellent wetting characteristics, and optimum thickness for the maximum boiling limit. These wicks in the condensing area must be optimized to significantly increase the condensing heat transfer by using hydrophobic surfaces. The wetting characteristics gradually vary from the perfectly wetting condition (hydrophilic) in the evaporating section to the partially wetting (hydrophobic) in the condensing section. The flow path for the liquid flow from the condensing section to the evaporating section is optimized to significantly reduce the pressure drop.

When heat is added on the evaporating region of the microstructured surface from the heat source, as shown in FIG. 15, the heat is transferred to both the liquid plugs (sensible heat) and the region between the liquid plugs (latent heat). As the heat reaching the region between the liquid plugs, it is transferred through the nanostructure wicks and to the liquid-vapor interface, where the thin evaporation heat transfer occurs. The vapor generated in these areas will be immediately removed by the mechanically-controlled two-phase flow, and directly brings the heat from the evaporating (hot) area to the condensing (cold) area and condenses into liquid. The condensate will be pumped back by the mechanical controlled oscillator. When the total power and the heat flux level are high, the capillary force produced in the wick cannot overcome the pressure drop in the wick, the vapor chamber will reach the capillary limit, which is the reason why the current available heat pipe, although it is much better than single phase heat transfer cannot remove the heat at an extra-high level of heat flux such as occurring in the high power TDLs. When the input power is higher, while the oscillating motions of liquid plugs and vapor bubbles produced by the mechanically controlled oscillator can remove heat by the forced convection, it can directly help to bring condensate back to the evaporating surface.

Equally important, the oscillating motion makes it possible to use nanofluid as the working fluid. Although the nanofluid was introduced only about 10 years ago, no application for its use was available until the nanofluid oscillating heat pipe is developed. The reason is that the nanoparticles can collect on the walls and thus the effect on the heat transport capability of displaced nanofluid significantly reduces. For the system described in this invention, the oscillating motion excited existing in the oscillating heat pipe (which can achieve high frequency) directly disturb the nanoparticles and make the nanoparticles to be suspended in the base fluid. The addition of nanoparticles into the working fluid in the OHP can further increase the heat transport capability of the thin film evaporator on the microstructured surface. Again due to the oscillating motions, the nanoparticles will not separate from the working fluid of the OHP. It should be noted that the nanoparticles will be added to the working fluid while the heat spreader is be filled prior to it being sealed off. Finally, it is also very important to note that cryogenic operation has already been demonstrated in oscillating heap pipe system.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL
VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 1. Schematic setup of a thin disk laser head. The pump optics, parabolic mirror and retro-reflectors are arranged for multiple passes of the pump radiation. (Prior Art.)

FIG. 2. Geometry of "Heat Sink" and "Capped" configuration for cooling of Yb:YAG thin disk, 225 μm thick with a pumping power loading of 5 kW/cm². Excited thin disk diameter was 10 mm (2×$L_A$). (Prior Art.)

FIG. 3. Temperature contours across radial direction and along supporting structure for "cold-finger" and "capped" Yb:YAG thin disk, 225 μm thick with a pumping power loading of 5 kW/cm². Excited thin disk was 10 mm diameter. (Prior Art.)

FIG. 4. Temperature variation across radial direction and along supporting structure for Yb:YAG thin disk, 225 μm thick with a pumping power loading of 5 kW/cm². (Prior Art.)

FIG. 5. Deformation (micro-meters—μ) for both "cold finger" and "capped" Yb:YAG thin disk of 225 μm thickness and 5 kW/cm² for geometrical shape of FIG. 2. (Prior Art.)

FIG. 6. Yb:YAG thin disk amplifier axial expansion as function radius for both "cold finger" and "capped" Yb:YAG configuration at 5 kW/cm² and 225 micron thickness. (Prior Art.)

Figure 7:
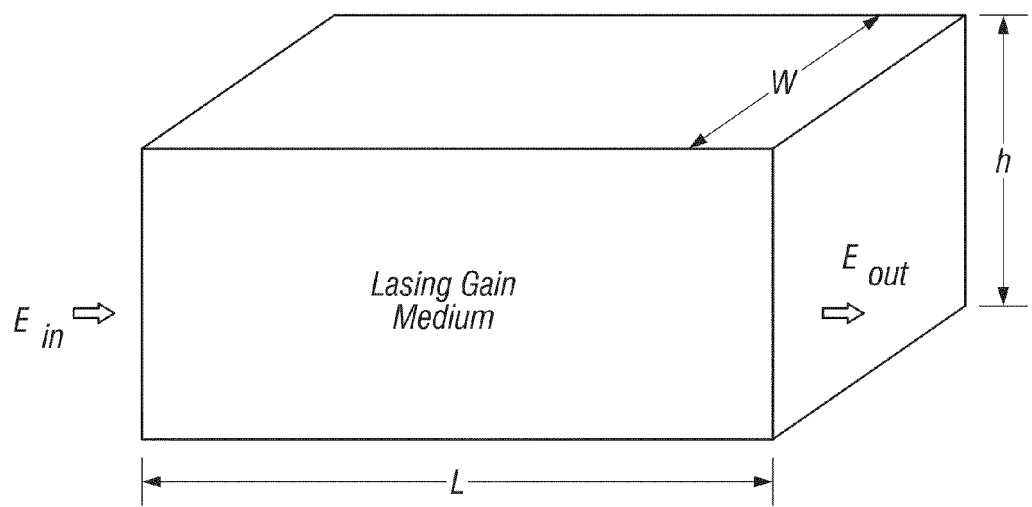

FIG. 7. Computational approach for analyzing optical path difference (OPD) for propagation of optical beam through abberrated gain medium like that in thin disk laser. (Prior Art.)

FIG. 8. Stress experience for both "cold finger" and "capped" Yb:YAG thin disk of 225 μm thickness and 5 kW/cm² for geometrical shape of FIG. 2. (Prior Art.)

FIG. 9. An (OPD) for both "cold finger" and "capped" Yb:YAG thin disk of 225 μm thickness and 5 kW/cm² for geometrical shape of FIG. 2 and room temperature ambient conditions. (Prior Art.)

FIG. 10. "Cold finger" thin disk amplifier temperature comparison with low (180 W/m*° K–CuW) and higher 10 kW/m*° K) thermal conducted values based on advanced heat spreaker technology described in this invention. (Prior Art.)

FIG. 11. Thin disk amplifier deformation comparison with a low (180 W/m*K–CuW) and higher 10,000 W/m*K values using advanced heat pipe technology reported in this patent. (Prior Art.)

FIG. 12. Stress behavior comparison with "heat spreader" having K=180 and 10,000 W/m*K. (Prior Art.)

FIG. 13. "Cold-finger" thin disk OPD comparison with low (180 W/m*° K–CuW) and higher 10 kW/m*° K) thermal conducted values based on advanced heat spreaker technology described in this invention. (Prior Art.)

FIG. 14. Conventional "wicked" heat pipe with vapor—working counter flow. (Prior Art.)

FIG. 15. Oscillating heat pipe (OSP) basic principles and examples, (a) miniaturized OHP—upper right (1×2 in²) and larger, 1×2 ft² (lower right). (Prior Art.)

FIG. 16. Nanofluid Effect on the Heat Transport Capability in an Oscillating Heat Pipe (Filled Ratio=50%, Nanoparticles: Diamond, 5-50 nm, 1.0% in volume). (Prior Art.)

FIG. 17. Operating temperature effect on the thermal resistance at various heat loads. (Prior Art.)

FIG. 18. Nano-particle effect on thin film evaporation. (Prior Art.)

FIG. 19. Inventive mechanically-controlled oscillating two-phase flow system serving as a "heat spreader".

FIG. 20. Conceptual configuration of lasing thin disk on "heat spreader" using micro-heat pipes has super-high effective thermal conductivities. Note: Real conceptual design of "heat spreader" does not require jet impingement cooling. Specialized heat pipe go to "cold finger—plate" for heat removal from system illustrated in FIG. 23.

FIG. 21. "Effective" thermal conductivity of three dimensional, flat plate oscillating heat pipe (3D-FP-OHP).

Figure 22:
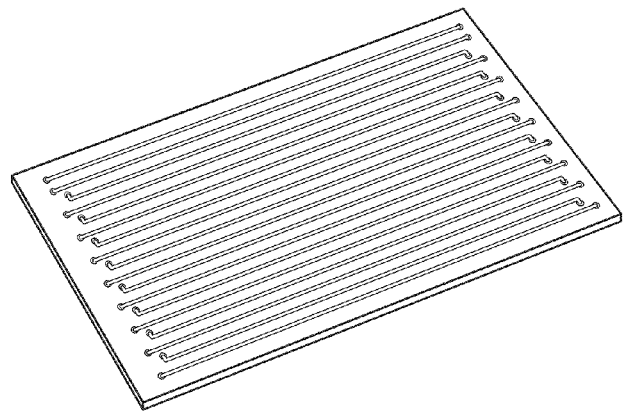

FIG. 22. Photo of OHP used for data of FIG. 21—top groves in plate. Bottom—top cover with vacuum—"working-fluid" fill port 3D-FP-OHP.

Figure 23A:
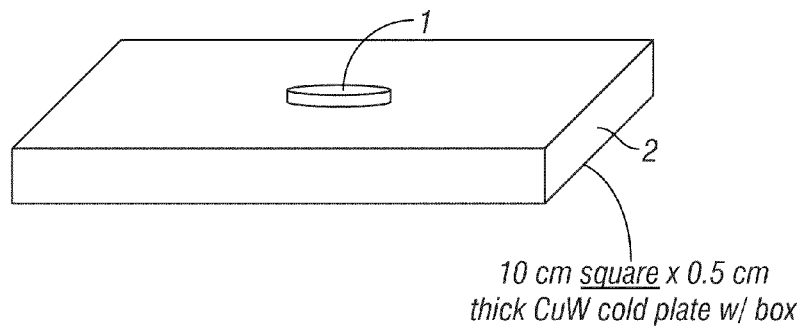
Figure 23B:
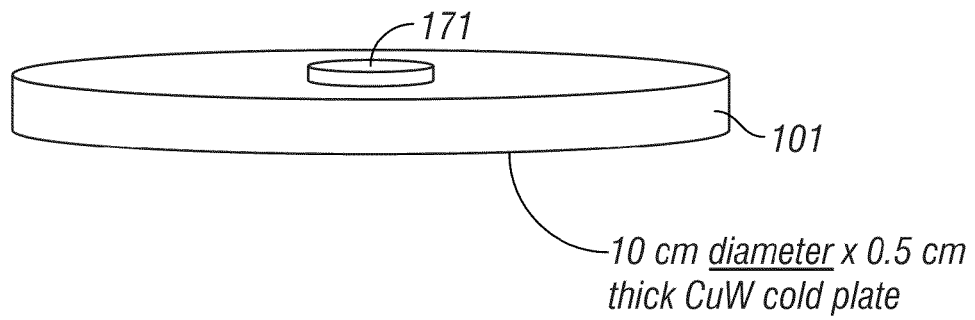

FIG. 23. Various thin disk mounting configurations with Advance Heat Spreader—Oscillating Heat Pipe with forced convection using mechanically drien fluid pump: Cases 1 and 2 for square (or rectangular) and circular rectangular, advanced heat spreader plate.

Figure 24A:
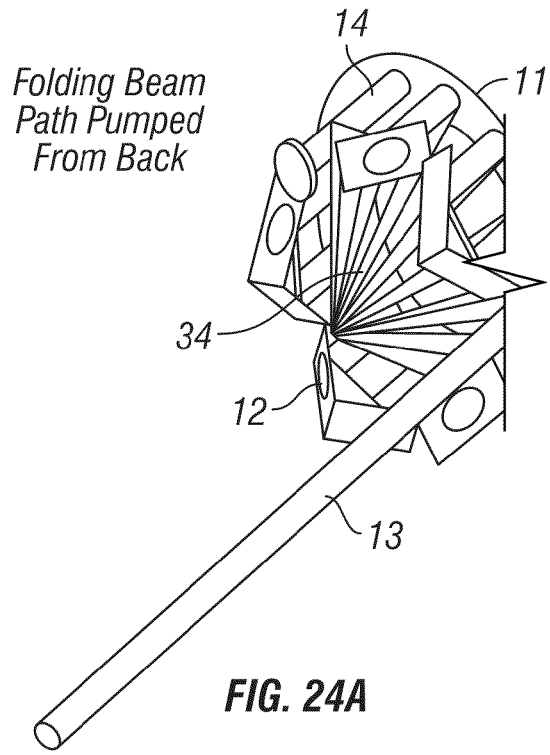
Figure 24B:
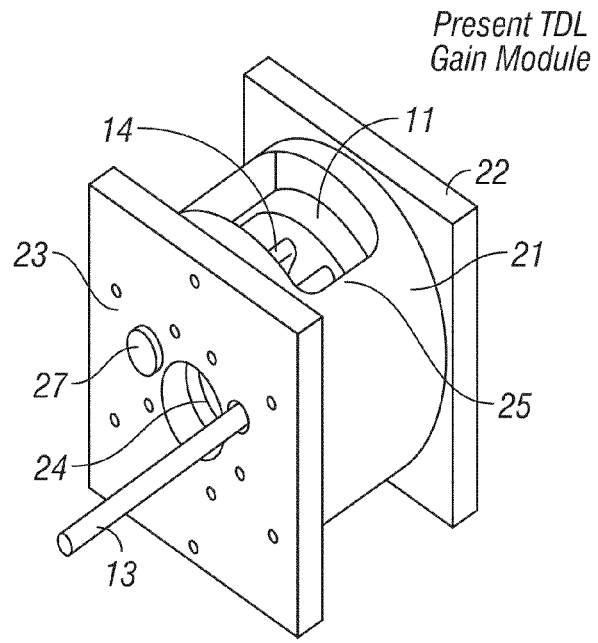
Figure 24C:
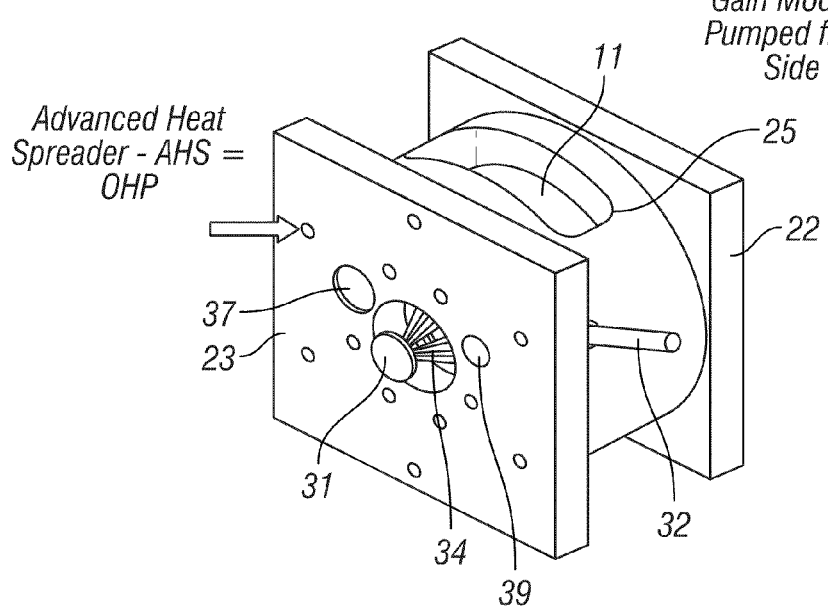
Figure 25A:
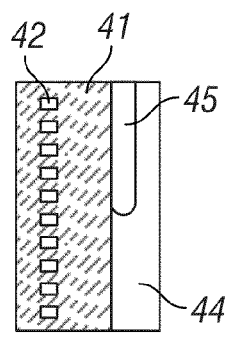
Figure 25B:
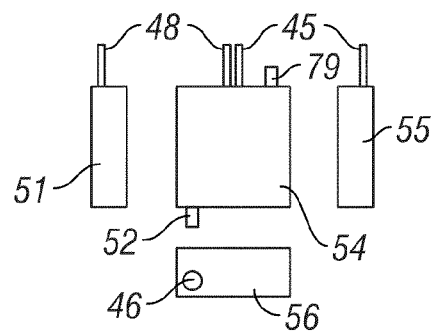
Figure 25C:
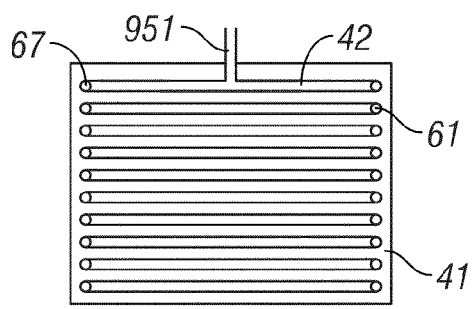
Figure 25D:
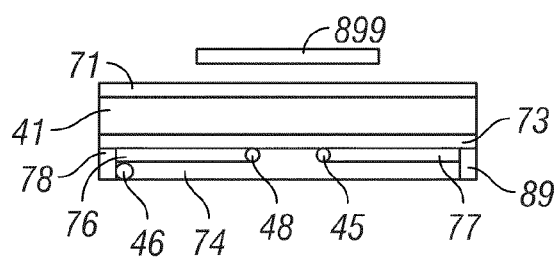
Figure 25E:
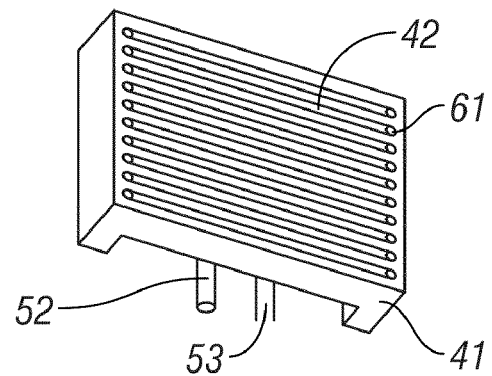
Figure 25F:
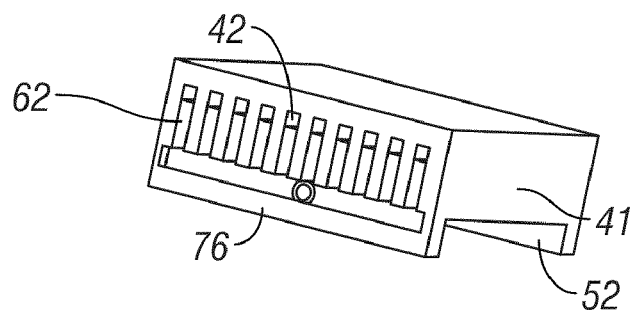
Figure 25G:
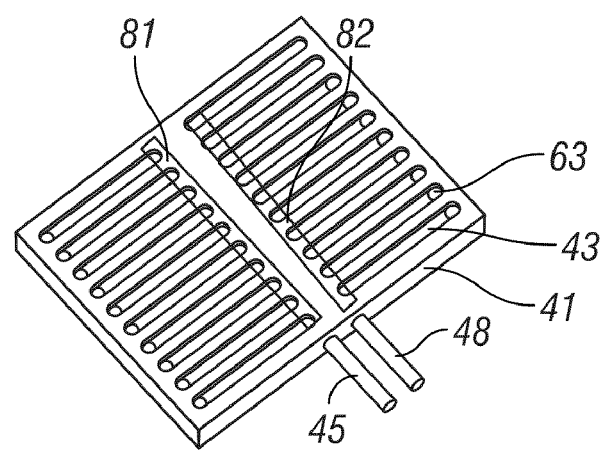
Figure 26A:
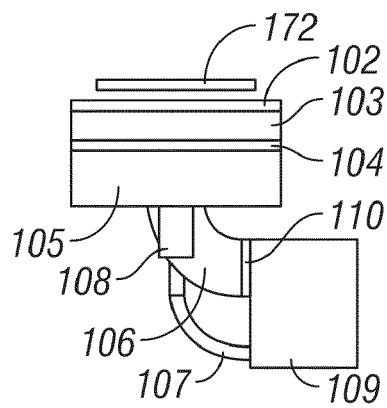
Figure 26B:
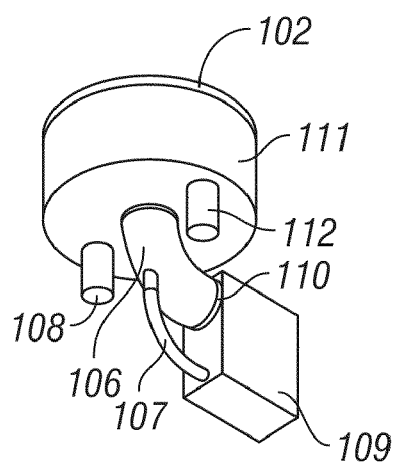
Figure 26C:
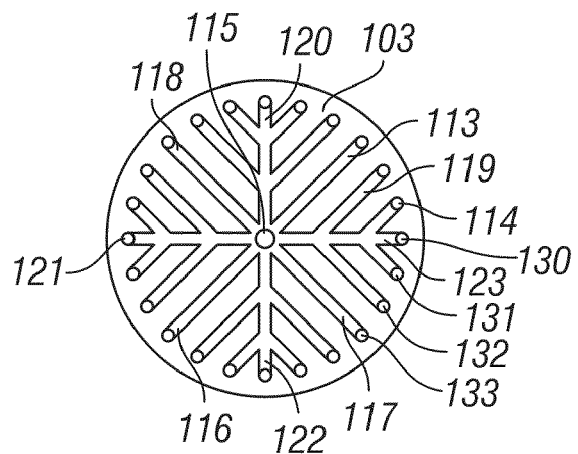
Figure 26D:
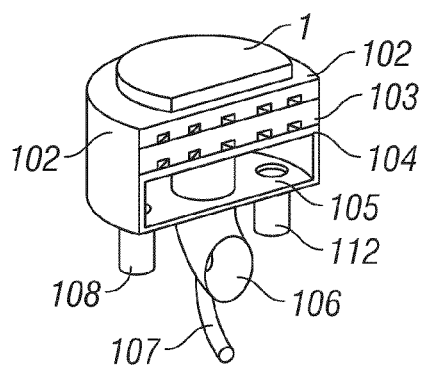
Figure 26E:
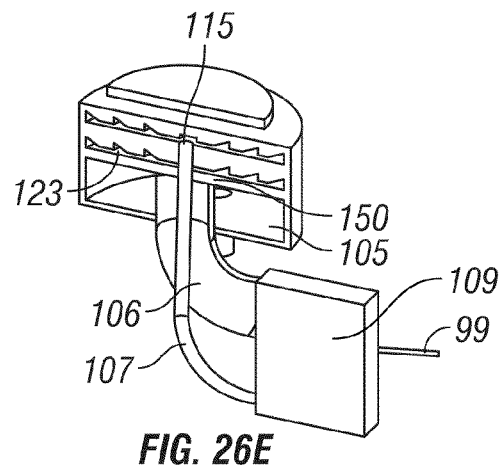
Figure 26F:
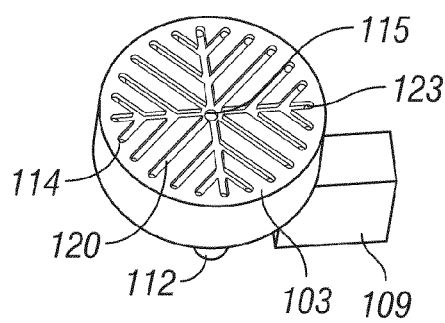
Figure 26G:
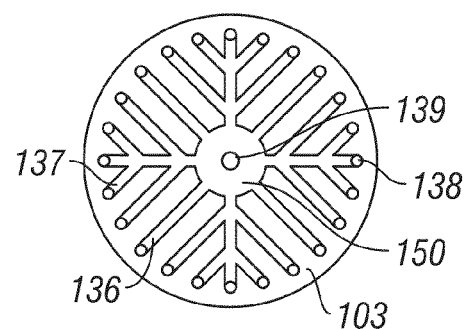

FIG. 24. Variation for thin disk mounting within Thin Disk Laser Gain Module.

FIG. 25. Design schematic for linear array mechanically driven oscillating heat pipe for TDL.

FIG. 26. "Spoked"—Hybrid Fluid—Pump Oscillating Heat Pipe—AHS: Option A.

Figure 27A:
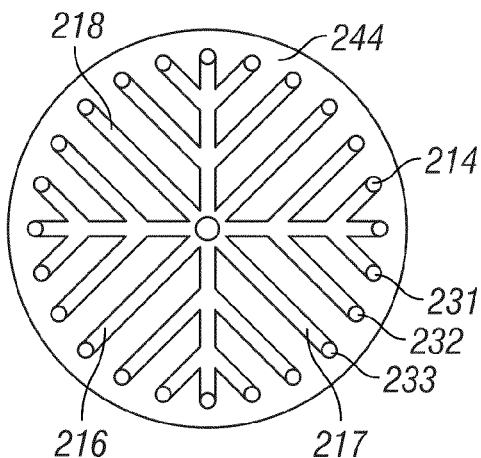
Figure 27B:
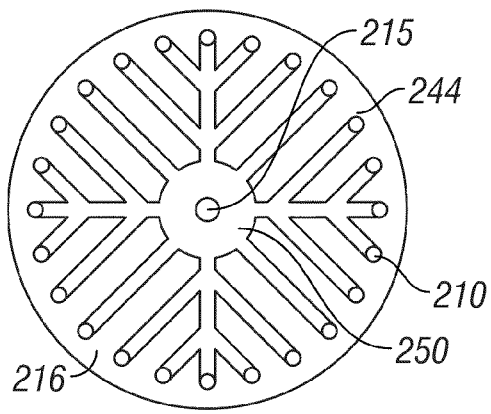
Figure 27C:
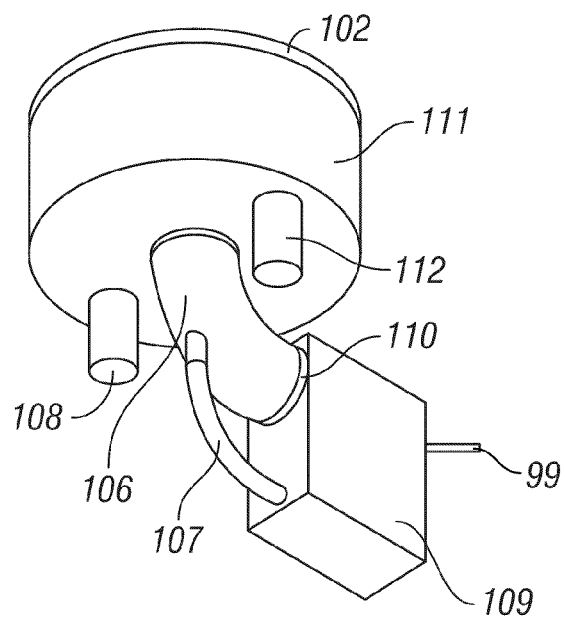
Figure 28B:
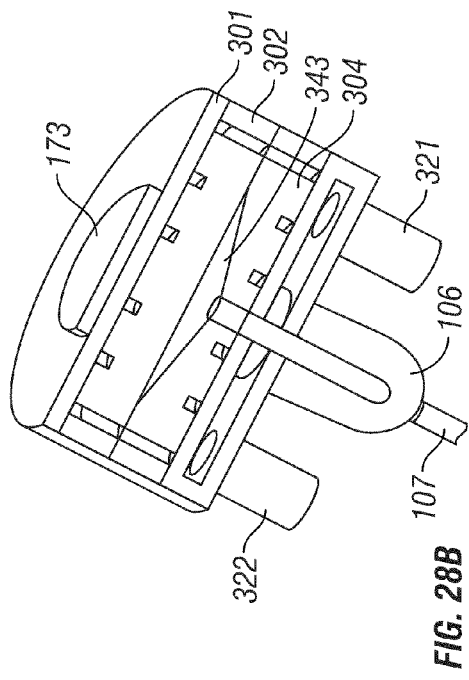
Figure 28D:
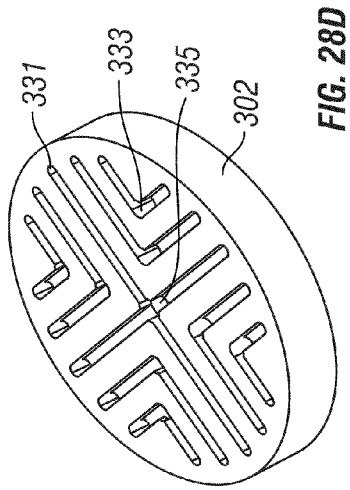
Figure 28A:
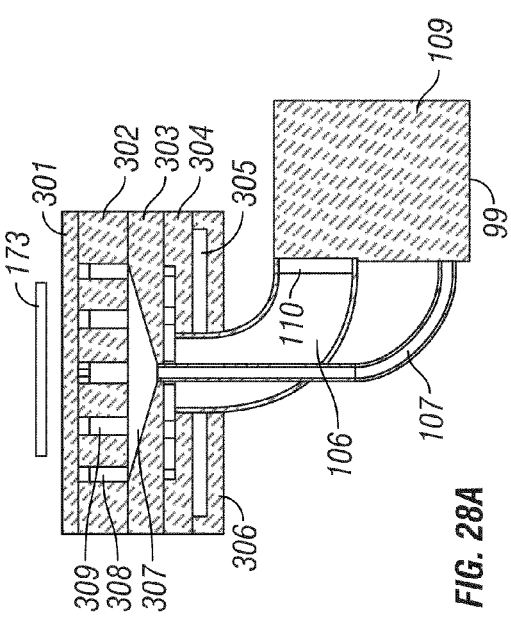
Figure 28C:
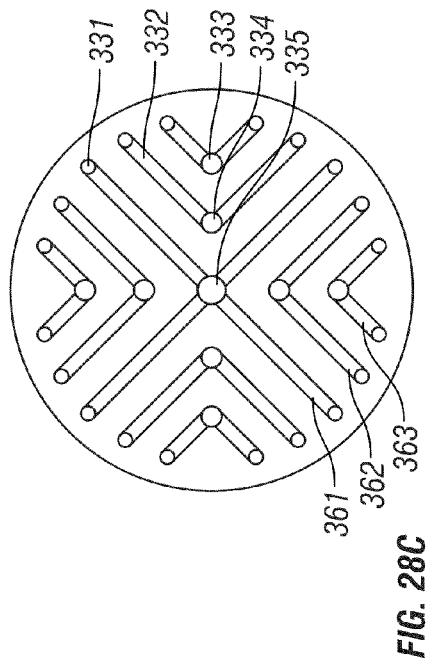
Figure 28E:
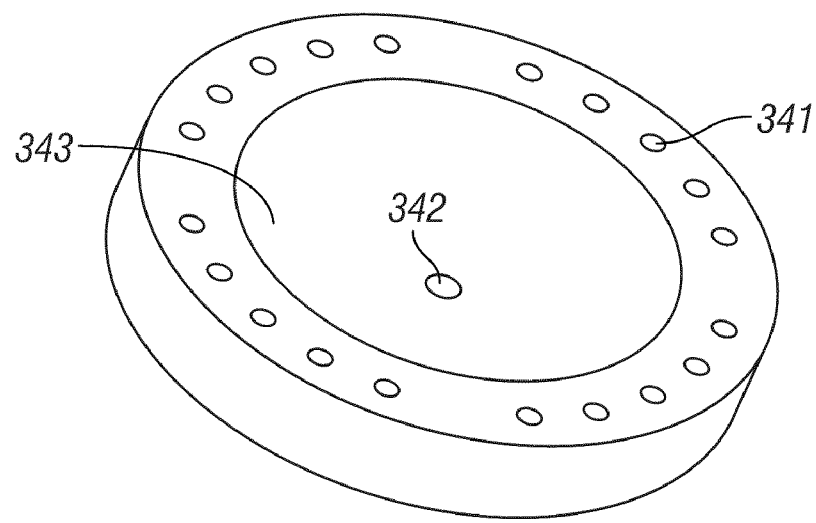
Figure 28F:
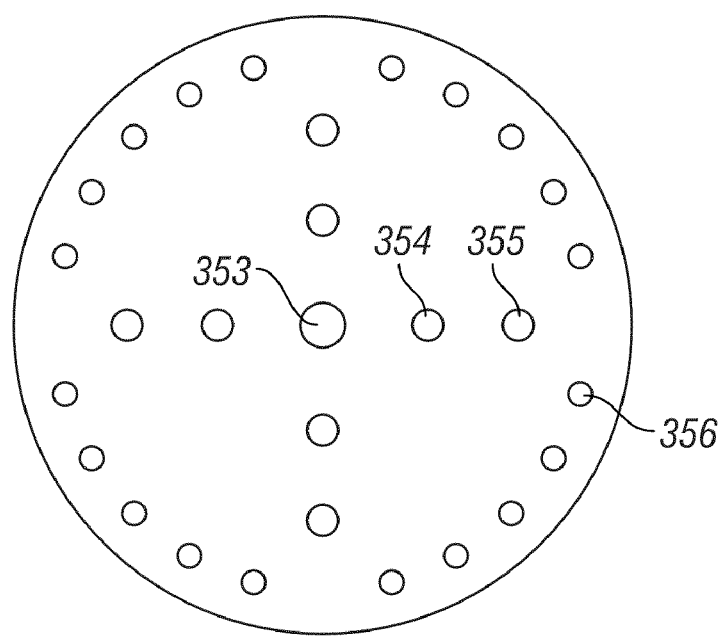
Figure 29A:
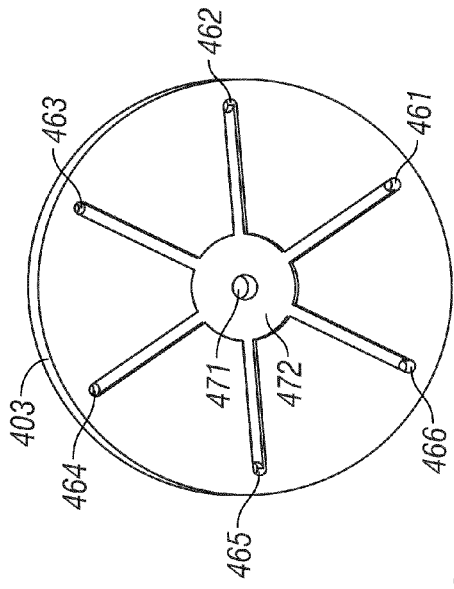
Figure 29B:
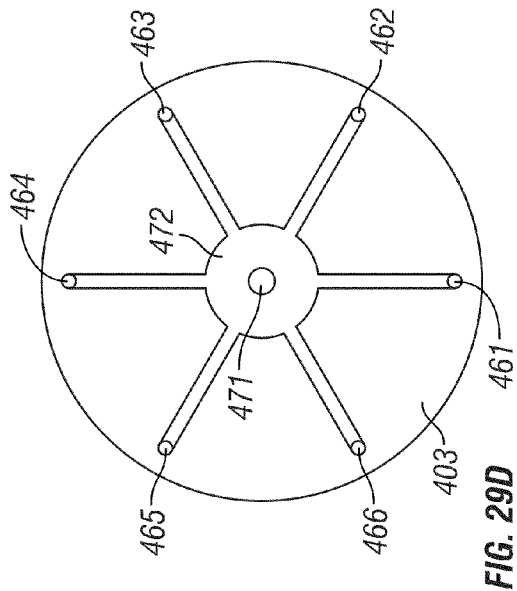
Figure 29C:
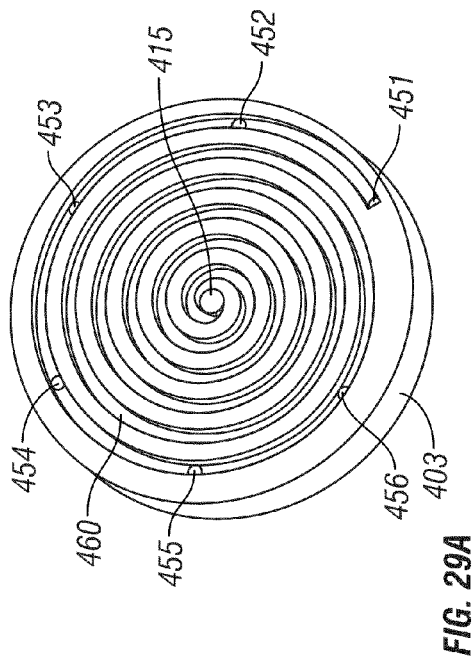
Figure 29D:
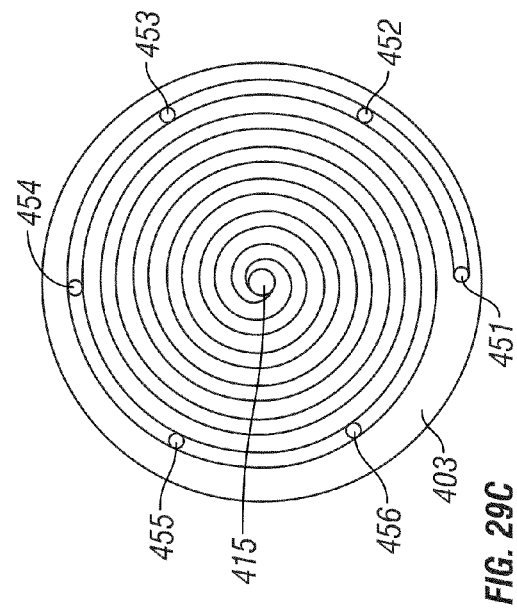

FIG. 27. "Spoked"—Hybrid Fluid—Pump Oscillating Heat Pipe—AHS: Option B.

FIG. 28. "Spoked"—Hybrid Fluid—Pump Oscillating Heat Pipe—AHS: Option C.

FIG. 29. Single "Spiral"—Hybrid Fluid—Pump Oscillating Heat Pipe as Advanced Heat Spreader for Thin Disk Laser.

Figure 30A:
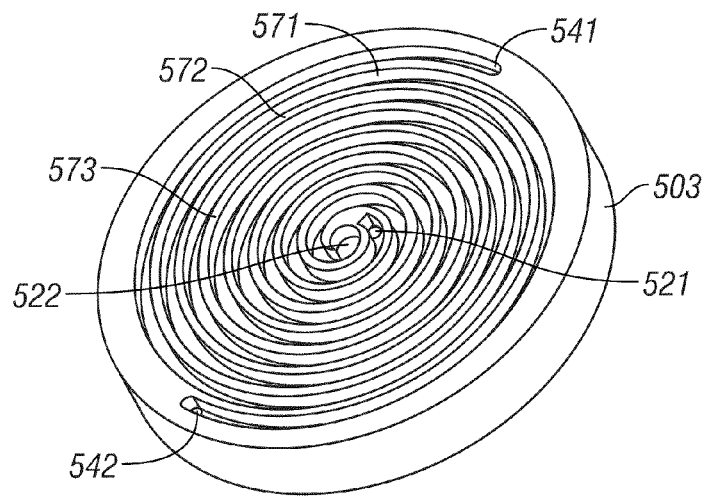
Figure 30B:
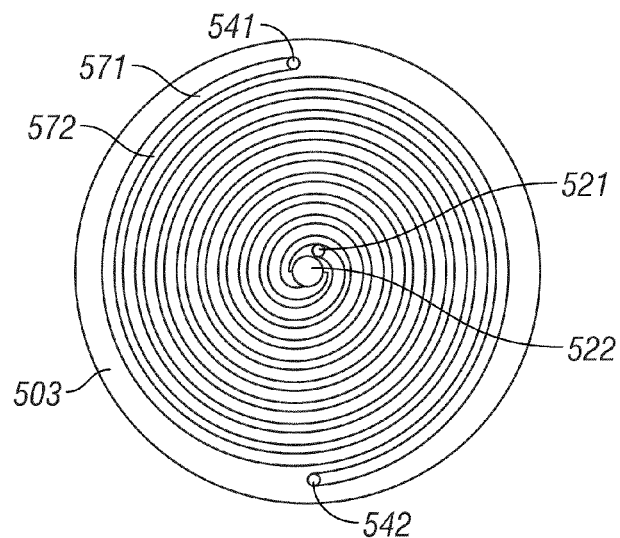
Figure 30C:
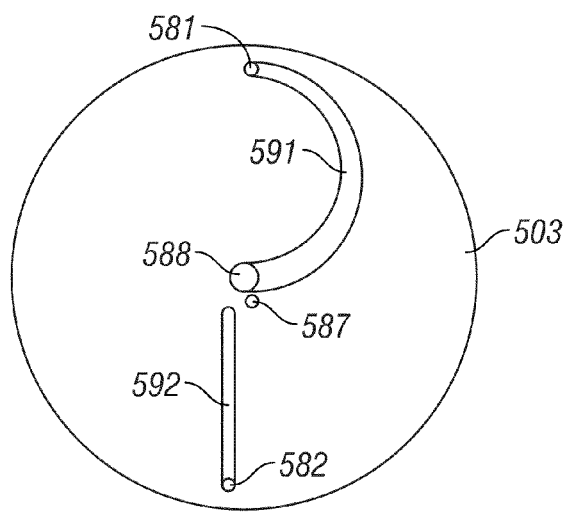

FIG. 30. Double "Spiral"—Hybrid Fluid—Pump Oscillating Heat Pipe as Advanced Heat Spreader for Thin Disk Laser.

DETAILED DESCRIPTION OF THE INVENTION

The encompassing methodology of making such a "heat spreader" is to use a "mechanically-controlled, two-phase heat pipe as shown in FIGS. 19-20. An integrated high power thin disk laser and a novel heat spreader having effective thermal conductivity $K_{eff}$≅10-20,000 W/m*K enables greatly improved thin disk laser (TDL) performance. The potential near isothermal behavior of the heat exchanger (really "heat spreader") on the lasing thin disk should greatly reduce the TDL dynamic focus, temperature induced-stress-birefringence resulting in potential TDL laser beam quality performance. The heat exchanger employs a mechanically controlled, two phase oscillating motion of the working fluid of heat pipe to achieve much higher effective thermal conductivity and resultant heat transfer, greater than kW/cm², a value never before conceived or demonstrated. Implementing a closed cycle fluid pump into the oscillating heat pipe (OHP) structure greatly improves the thermal conductivity at high fluencies due to the enhanced convection of the working liquid—vapor fluid than capable using the internal pressure created during the vaporization process of the OHP. Further enhanced performance is achieved via use of nanoparticles and nano-fluids inside of the working fluid to acquire the near isothermal control of the thin disk laser. In addition, this integrated laser—unique heat pipe thermal management system allows good CTE (coefficient of thermal expansion). This condition exists since the material used to make the heat pipe system can be made from basically any material including the laser material itself as like Yb:Y AG lasing material and ceramic YAG, an arrangement which could provide nearly perfect CTE over the entire operating temperature range from sub-cryogenic to greater than room temperatures.

The properties of this novel—high performance system include:

- The mechanically-controlled two-phase oscillating motion can reach a very high flow rate, which can reach an extra high level of temperature uniformity resulting in higher than all other kinds of heat pipes including the standard vapor chamber.
- The hybrid system utilizes both the sensible and latent heats to transport heat from the hot area to the cold area while the conventional heat pipes including the vapor chamber transport heat only by the latent heat. Due to the latent heat, the temperature distribution can reach a high level of uniformity. Nanostructures used modify the evaporating surface and maximize the thin film evaporation, resulting in an unprecedented evaporating heat transfer rate.
- Due to the oscillating motion, the nanofluid can be used, which significantly increase the heat transport capability.
- The plasma-nano-coated surface can modify and improve the condensing surface resulting in high condensing heat transfer rate.
- Due to the two phase system, the pressure drop is much lower than that of single liquid phase, which produces an extra high flow rate.
- The hybrid system effectively integrates extra high level of heat transfer rate of thin film evaporation, high thermal transport capability of nanofluids, low pressure drop, and strong oscillating motions controlled by mechanical system, which results in an extra high heat transport capability.
- In addition to the phase change heat transfer, the strong oscillating motion of nanofluids existing in this hybrid system will result in additional vortex in the liquid plugs that significantly enhancing the heat transfer rate.

Referring to FIG. 20, this unique integrated thermal management system for a thin disk laser in its simplest form consists of a thin disk (TD) 991, nominally 0.2 millimeters (mm) in thickness and 1-2 cm diameter which is mounted on a supporting structure, like a nominally 1 mm copper-tungsten material or an undoped host material identical to the thin disk laser material like YAG for Yb:YAG laser system. This integrated TD is then placed on an advanced heat spreader 993 as also shown in FIG. 19 as 982 which is cooled (i.e., heat removed from it) in its simplest form by jet impingement water cooling 983 or other coolants like acetone, ammonia and liquid nitrogen. The heat spreaders 993 and 995 action—oscillating liquid plugs and vapor bubbles, however, have a very high thermal conductivity created by the vaporization-condensation of a closed cycle oscillating heat pipe system. Various types of fluid pumps 997 can be used including piezoelectric fluid pumps where the flow is closed loop, unidirectional and can flow from left to right in FIG. 20 or the opposite but one of these directions as part of closed loop flow in this convection driven (via inline fluid pump) OHP.

Second Embodiment

This embodiment comprises use of either a square or rectangular array of parallel oscillating heat pipes configured very close to each other to create a near isothermal condition on the heat spreader top surface at high power including greater than kW's/cm². FIGS. 23-a, 24 and 25 illustrate square/rectangular linear array system for a very high thermal conductivity heat spreader for use with a high power, good operating thin disk laser system. The thin disk 1 and/or 899 is mounted on the oscillating closed loop heat pipe 2 and/or 41, which is internally integrated and coupled with ports 48 and 45 to the working fluid pump not shown. FIG. 25-b shows this linear array advanced heat spreader system (hereafter AHS system) consisting of the top 54, two sides 51 and 55 and the inlet coolant connection 52 and outlet connection 79 for heat removal from the integrated advanced heat spreader system 982 in FIG. 19-b. The coolant can be water or liquid coolants like acetone, ammonia or nitrogen (cryogenic). It is very important to recognize this coolant removes thermal heat from the AHS system that has heat "conducted diffusively" via the heat spreader from the warm lasing thin disk 1. The integrated AHS system shown in FIG. 25-d consists of four sections, 71, 41, 73 and the bottom cooling section consisting of components 78, 76, 46, 74, 77 and 89. The thin disk 1 in FIG. 23-a is mounted on optically polished section 71 in FIG. 25-d and is typically about 1 mm thick. Section 41 is the operating region top view of the AHS systems and the details are shown in FIGS. 25-c (top view of section 41) and 25-e (top view of section 41) and f (sliced sectional top view of section 41). FIG. 25-f is bottom view of section 41. Sidewalls 78 and 89 are part of the lowest section of the AHS system. The working fluid move within the slots like 42, typically 0.7 mm square, as the warm thin disk 1 causes this fluid to be vaporized causing the fluid to flow though the AHS structure via (1) the liquid plugs and vapor bubbles action of the OHP and (2) convective flow from the fluid pump connecting exit working fluid outlet port 48 and inlet working fluid port 45. For this inlet 45 and outlet 48 configuration, the flow direction is from right to left in slot 42 traveling toward 67 and then down 62 into the corresponding slot 43 going toward the central "trough" slot 82 which is fed by each of the slots shown in FIG. 25-c and are parallel with slot 42. "Trough" slot 82 is connected to exit tubing 48 which transfer the AHS working oscillating heat pipe to a closed loop fluid pump (not shown). This cooled working fluid is then returned to the AHS via tubing 45 into trough 81 which simultaneously feeds all of the channel slots parallel to 42 OHP channel.

The efficient heat spreading occurs via the OHP action in all the parallel slots like slot 42 and via the external fluid pump. The latent heat of vaporization of the working fluid greatly increases the heat transfer from the top of 41 to its bottom by the condensation of this fluid as it flows in the lower slots cooled in the coolant reservoir of section 74 which has heat removed from the system via tubing 52 and 79 illustrated in FIGS. 25-b and the top view of 41. Note that the pump out port 951 (FIG. 25-c) is used to evacuate the entire closed loop OHP plus fill it with the desired working fluid prior to sealing it off.

There is an important second aspect of this embodiment dealing with the placement of the linear array configured advanced heat spreader illustrated in FIG. 24. FIG. 1 shows thin disk laser prior art citing the critical issues in a high power TDL system. In FIG. 24-b, the configuration shows that the laser diode pump radiation 13 enters through hole 39 of the back side of the retro-reflector plate 23 holding the critical retro-reflectors 12. As the laser diode pump radiation 13 propagates (FIG. 24-a) toward the parabolic mirror 11, this radiation is reflected making multiple passes 34 into the thin disk 24 inside the TDL gain module 21 before finally reflecting from the flat mirror 27 and then making return pass 14 for increased excitation of the thin disk 24. This description is for the presently used mode of operating a thin disk laser. Due to the compactness of these TDL's with the multiple pass pumping of the lasing thin disk, a square or rectangular advanced heat spreader cooling a thin disk is very difficult to implement for such a gain module 21 in the present FIG. 24-b configuration. Therefore, for this embodiment, a practical method shown in FIG. 24-c is to have the focusing position for pumping thin disk 31 moved toward the rear of the retro-reflector plate 23. This adjustment is easily performed by increasing the focal length of the parabolic mirror 11 mounted on the parabolic plate 22. By this operation, the linear array AHS disclosed here can be integrated with nearly any type of thin disk laser system.

Depending on the desired temperature of the advanced heat spreader as governed by the coolant used, the entire TDL and new AHS system should be enclosed in an evacuated and sealed container to minimize air turbulence and condensation from ambient atmospheric constituents. Such an operation is imperative for any embodiment of this invention especially for temperature below and near 0° C. and absolutely for cryogenic operation.

The rectangular and square configuration of this embodiment of this linear array of oscillating heat pipe driven by an internal pump/blower also has many applications for cooling solar photovoltaic cells, large flat panel displays, slab lasers, microchip lasers, rf waveguides and laser mirrors.

Third Embodiment

The previous embodiment of the use of a square or rectangular configured, high power heat spreader with prior art thin disk laser requires changes in the gain module 25 design illustrated in FIG. 24. This embodiment of the invention offers an alternative, namely a circular configured system that can be inserted into the "present-day" thin disk laser designs as shown in FIG. 24-b. FIG. 23-b depicts such a circular or round advanced heat spreader with a circular lasing thin disk 171 and FIG. 23-c is top view of section 103. The embodiments and its other versions can be readily made to operate as a lasing thin disk 24 performs. FIG. 26-a shows the various parts of this new embodiment which consists of the lasing thin disk 172, an alternative OHP based heat spreader 103, a coolant chamber 105 removing the thermal heat from the heat spreader 103 which has a top plate 102 and lower plate 104. In addition, this heat spreader system is integrated with fluid pump 109 that increases the working fluid convection velocity through the slots 118 (for example) at much high flow rates than that created by the vaporization-condensation operation created in an oscillating heat pipe. FIG. 26-c illustrates the top view of the "spoked" configuration of the heat spreader 103 having the typical 0.7 mm square slots which are radially placed such that the working fluid (liquid and vapor) travels from the center 103 to the outer edge toward circular holes 114, 130-133 plus all other holes on same circular radius. The reason for the many main paths 116,122,117,130,113,120, 118 and 121 plus the "spokes" 137 from the main slot channels going from the central work fluid inlet 115 to the outside holes is to promote more uniform temperature profile in the top plate 102. Through these circular holes the working fluid flows into the bottom side of the heat spreader section (FIG. 26-g) through holes like 138 which is in direct contact with coolant water or other liquids like acetone, ammonia or nitrogen. Flowing through these slots on both of heat spreader section 103, the working fluid enters at top 150 of collection tube 106. The coolant liquids enter and exit through inlets 108 and 112. The flow of the working fluid through the return slots 183 on the bottom of heat spreader section 103 enter the collection tube 106 on its way to fluid pump 109. The advanced heat spreader pump-out/filling tube 99 is used to control the volume of working fluid in the heat spreader, assure that minimal impurities are introduced to the working fluid and sealed off or valved shut after filling. The fluid pump 109 increases the flow rate through the entire OHP system by flowing through the return tube 107 going through the entrance region 139 and exiting at distributing opening 115 into the rectangular slot paths. Note that the return tube 107 is concentric with return tube 107 and are separate volumes via welding of the two pieces. The types of fluid pumps are identical to that highlighted in the first embodiment.

The important features of this embodiment include its circular design, potential compact size and future direct insertion into present thin disk laser systems. The multiple pathways for the OHP processes of vaporization and condensation of the working fluid plus the enhanced convective flow by the fluid pumps should make it perform as a nearly isothermal surface for cooling the thin disk 172 plus improve the beam quality of the thin disk laser at high power with negligible dynamic focusing, near isothermal temperature profile across lasing thin disk, and stress-induced birefringence induced polarization losses.

Fourth Embodiment

This embodiment is close to the previous third embodiment but the changes can provide significant improvement by providing improved isothermal temperature profile across the thin disk. Important to note that the many main OHP slot paths 121,120,130,122 and 121 all have a direct path toward the outer return holes down to the bottom side of the heat spreader 103 shown in FIGS. 26-c and 26-d. This condition can create less flow into the main "spoke" arms originating from these main slot pathways. In FIG. 27-a and 27-b, these return holes like 130 in FIG. 26-c and 26-g were removed thus forcing the working fluid to always return through the cited "side spokes" via exit hole 210. All of the additional operation is like that described in FIG. 26.

Again, like the above third embodiment, the important features of this embodiments is its circular design, potential compact size and future direct insertion into present thin disk laser systems. The multiple pathways for the OHP processes of vaporization and condensation of the working fluid plus the enhanced convective flow by the fluid pumps should make it perform as a nearly isothermal surface for cooling the thin disk 172 using this embodiment of the invention plus improve the beam quality of the thin disk laser at high power with negligible dynamic focusing, near isothermal temperature profile across lasing thin disk, and stress-induced birefringence induced polarization losses Fifth Embodiment The fifth embodiment shown in FIG. 28 offers improved thermal profile uniformity and higher heat removal or heat spreading and is also very similar to the second embodiment. In this embodiment, the input position of the working fluid into the slotted cooling channels 361-363 are not all at the center of the heat spreader section 302. Instead they are distributed at various radial position to possibly provide enhanced working fluid flow velocity and thus improved temperature uniformity across the thin disk 173. FIGS. 28-c and 28-d illustrate several working fluid injection holes 333, 334 and the center hole 335. The return holes like 331 are identical to FIG. 27 along with the other parts of the fluid pump system.

The major difference in this design is fabrication of heat spreader system shown in FIGS. 28-a, -b and -e. The heat spreader comprises five sections the top plate 301 (nominally 1 mm) on which the thin disk 173 is mounted, the heat spreader section 302, the working fluid distributing cone 303, the returning working fluid component 304 and the coolant section 305 removing heat from entire heat spreading system.

The remainder of the system including fluid pump 109, working fluid collector 106, filling—evacuation tube 99, and returning working fluid tube 107 are identical to the previous second embodiment.

The working fluid distributing cone section 303 has the working fluid injected into it at the injection hole 342. From this filled cone section 303, the nozzle tubing like 308 and 309, the heat spreader 302 has the working fluid injected through the nozzles like 335, 334 and 333 into the rectangular slots similar to 361, 362 and 363 enabling the oscillating heat pipe action which spreads the heat from the thin disk 173. This working fluid then returns through the outer holes of the bottom plate (FIG. 28-f) holes like 356 into the returning working fluid section 304 and then into the fluid pump for the forced convection fluid flow. The coolant system removing heat from the entire heat spreader system is cooled via the exit and entrance tubing 321 and 322.

Again like the above third embodiment, the important features of this embodiments include its circular design, potential compact size and future direct insertion into present thin disk laser systems. The multiple pathways for the OHP processes of vaporization and condensation of the working fluid plus the enhanced convective flow by the fluid pumps should make it perform as a nearly isothermal surface for cooling the thin disk 173 using this embodiment of the invention plus improve the beam quality of the thin disk laser at high power with negligible dynamic focusing, near isothermal temperature profile across lasing thin disk, and stress-induced birefringence induced polarization losses

Sixth Embodiment

This next embodiment utilizes a single, spiral configuration of the slotted grooves used for the forced convection of the oscillating heat pipe action inside of another advanced heat spreader system. FIG. 29 shows the details of the differences from the five previous embodiments. This embodiment's approach is an alternative toward improving the near isothermal temperature profile for the thin disk 1 and 171. All of the forced convection working fluid system including fluid transfer parts are preferably the same. A preferred difference from the embodiments in FIG. 26-28, respectively, is a different heat spreader section 403 from 102, 244 and 302. Here, a single section spiral having nominal diameter of 0.7 mm is placed in the top side of 403 which has a center 415 on top view corresponding to 471 on the bottom view of section 403. The returning paths are six holes 461-466 placed equally around the last spiral. The working fluid then is re-cycled by the same fluid pump system described above.

Again, like the above third embodiment, the important features of this embodiments is its circular design, potential compact size and future direct insertion into present thin disk laser systems. The multiple pathways for the OHP processes of vaporization and condensation of the working fluid plus the enhanced convective flow by the fluid pumps should make it perform as a nearly isothermal surface for cooling the thin disk 173 using this embodiment of the invention plus improve the beam quality of the thin disk laser at high power with negligible dynamic focusing, near isothermal temperature profile across lasing thin disk, and stress-induced birefringence induced polarization losses

Seventh Embodiment

The last embodiment is very similar to the sixth one except a double spiral configuration of the slots 571 and 572 is used and the working fluid flows in opposing directions. This arrangement is another attempt to provide better isothermal conditions on the lasing thin disk. Through holes 541 and 542 at the end of each slotted spirals, the working fluid flows back into the collecting tube and the fluid pump. The two injection holes 587 and 588 provide the convectively enhanced flow into each of the two spiral grooves for them to have the working fluid flow to go from the center of the advanced heat spreader to the outside radial positions. An alternative is to have the working fluid in each of these spiral to be opposing or in opposite directions. This can be enabled by having port 522 have the working fluid be injected into it and port 541 also be injected with its outlet being 541 as another method to improve the isothermal conditions on the thin disk. In the latter configuration, the injected flow through tube 107 would have part of its fluid be transferred through 591.

Again like the above third embodiment, the important features of this embodiments is its circular design, potential compact size and future direct insertion into present thin disk laser systems. The multiple pathways for the OHP processes of vaporization and condensation of the working fluid plus the enhanced convective flow by the fluid pumps should make it perform as a nearly isothermal surface for cooling the thin disk 173 using this embodiment of the invention plus improve the beam quality of the thin disk laser at high power with negligible dynamic focusing, near isothermal temperature profile across lasing thin disk, and stress-induced birefringence induced polarization losses.

In the preferred embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. Thermal management apparatus for a thin disk laser system enabling the laser system to have isothermal temperatures across and throughout a thin disk, said apparatus comprising:
   a mechanically controlled oscillating heat pipe having effective thermal conductivity of 10-20,000 W/m*K;

a thin disk lasing crystal or ceramic bonded to said mechanically controlled oscillating heat pipe; and a supporting structure including a surface bonded to the thin disk lasing crystal or ceramic that matches the CTE (coefficient of thermal expansion) of both the thin disk lasing crystal or ceramic and the mechanically controlled oscillating heat pipe.

2. Apparatus as defined in claim 1 wherein said apparatus causes isothermal conditions across and throughout the thin disk lasing crystal or ceramic to promote equal phase fronts in axial lasing direction.

3. Apparatus as defined in claim 1 wherein said thin disk lasing crystal or ceramic is selected from the group consisting of Yb:YAG, Nd:YAG, Yb:KYW, doped sesquioxides, tungstates, erbium and thullium doped crystals, doped Ca salts like Yb:CaF$_2$ and doped glass.

4. Apparatus as defined in claim 1 additionally comprising nano-fluids and nano-particles to enhance desired temperature conditions and specific spatial variations desirable for specific laser performances.

5. Apparatus as defined in claim 1 wherein said apparatus is incorporated into a laser system selected from the group consisting of pulsed, cw and ultrashort laser systems.

6. Apparatus as defined in claim 1 wherein said apparatus minimizes initial thermal transient conditions in a thin disk laser optical system.

7. Apparatus as defined in claim 1 additionally comprising a heat spreader.

8. Apparatus as defined in claim 1 wherein said apparatus reduces a transient thermal lens for the thin disk laser system.

9. Apparatus as defined in claim 1 wherein said apparatus operates in a vacuum.

10. A computer comprising one or more of the apparatuses of claim 1.

11. Thermal management method for a thin disk laser system enabling the laser system to have isothermal temperatures across and throughout a thin disk, the method comprising the steps of:

mechanically controlling an oscillating heat pipe having effective thermal conductivity of 10-20,000 W/m*K;

bonding a thin disk lasing crystal or ceramic to the mechanically controlled oscillating heat pipe; and providing a supporting structure including a surface bonded to the thin disk lasing crystal or ceramic that matches the CTE (coefficient of thermal expansion) of both the thin disk lasing crystal or ceramic and the mechanically controlled oscillating heat pipe.

12. The method as defined in claim 11 wherein the method causes isothermal conditions across and throughout the thin disk lasing crystal or ceramic to promote equal phase fronts in axial lasing direction.

13. The method as defined in claim 11 additionally comprising the step of forming a heat spreader.

14. The method as defined in claim 11 wherein the method reduces a transient thermal lens for the thin disk laser system.

15. The method as defined in claim 11 additionally comprising the step of performing the method within a computer.

16. The method as defined in claim 11 additionally comprising the step of operating in a vacuum.

* * * * *

UNITED STATES PATENT AND TRADEMARK OFFICE
CERTIFICATE OF CORRECTION

PATENT NO. : 8,213,471 B2  Page 1 of 1
APPLICATION NO. : 13/012697
DATED : July 3, 2012
INVENTOR(S) : LaVerne Arthur Schlie et al.

It is certified that error appears in the above-identified patent and that said Letters Patent is hereby corrected as shown below:

Column 2, line 53, delete "TDt" and substitute --TD--

Column 3, line 10, delete "7,200,216" and substitute --7,200,160--

Column 4, line 13, delete "Ω" and substitute --π--

Column 9, line 42, delete "10-13" and substitute --19-21--

Column 13, line 56, delete "OSP" and substitute --OHP--

Column 14, line 16, delete "circular rectangular" and substitute --circular, respectively--

Column 14, line 64, delete "YB:Y AG" and substitute --Yb:YAG--

Column 17, line 32, delete "and Fig. 23-c is top view of section 103"

Column 18, line 4, delete "107" and substitute --106--

Column 19, line 43, delete "102" and substitute --103--

Signed and Sealed this
Ninth Day of October, 2012

David J. Kappos
*Director of the United States Patent and Trademark Office*

UNITED STATES PATENT AND TRADEMARK OFFICE
CERTIFICATE OF CORRECTION

PATENT NO. : 8,213,471 B2  
APPLICATION NO. : 13/012697  
DATED : July 3, 2012  
INVENTOR(S) : LaVerne Arthur Schlie et al.

Page 1 of 1

It is certified that error appears in the above-identified patent and that said Letters Patent is hereby corrected as shown below:

Column 2, line 13, delete "4,921,041;"

Signed and Sealed this  
Nineteenth Day of February, 2013

Teresa Stanek Rea  
*Acting Director of the United States Patent and Trademark Office*